(12) United States Patent
Hiramatsu

(10) Patent No.: US 6,934,450 B2
(45) Date of Patent: Aug. 23, 2005

(54) OPTICAL PATH-CHANGING CONNECTOR

(75) Inventor: Seiki Hiramatsu, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 41 days.

(21) Appl. No.: 10/731,142

(22) Filed: Dec. 10, 2003

(65) Prior Publication Data
US 2004/0114866 A1 Jun. 17, 2004

(30) Foreign Application Priority Data
Dec. 10, 2002 (JP) .................... 2002-358264

(51) Int. Cl.[7] .............. G02B 6/26; G02B 6/43
(52) U.S. Cl. .............. 385/52; 385/31; 385/50; 385/75; 385/89; 385/126; 385/132; 385/137; 385/139
(58) Field of Search .......... 385/89–94, 31, 385/39, 49, 50, 52, 126, 132, 137, 139, 136, 88, 55, 75

(56) References Cited

U.S. PATENT DOCUMENTS 6,554,493 B2 * 4/2003 Melchior et al. ........... 385/89
6,821,027 B2 * 11/2004 Lee et al. .................... 385/89
2003/0198439 A1 * 10/2003 Hiramatsu .................. 385/39

FOREIGN PATENT DOCUMENTS

| JP | 11-352362 | 12/1999 |
| JP | 2000-304953 | 11/2000 |
| JP | 2001-264587 | 9/2001 |

* cited by examiner

Primary Examiner—Frank G. Font
Assistant Examiner—Michael P. Mooney
(74) Attorney, Agent, or Firm—Leydig,Voit & Mayer, Ltd.

(57) ABSTRACT

An optical path-changing device has a cladding having a first face, a second face, and at least one mirror surface; and cores, each core having a first core end surface exposed at the first face and a second core end surface exposed at the second face, each core providing a continuous optical path extending from the first core end surface to the mirror surface, changing in direction at the mirror surface, and extending to the second core end surface. The first core end surfaces and the second core end surfaces are arranged two-dimensionally at the first face and the second face, respectively. First pin insertion apertures on an exterior casing member accommodating the optical path-changing device provide positional adjustments relative to the optical axes of the first core end surfaces.

17 Claims, 20 Drawing Sheets

FIG. 6
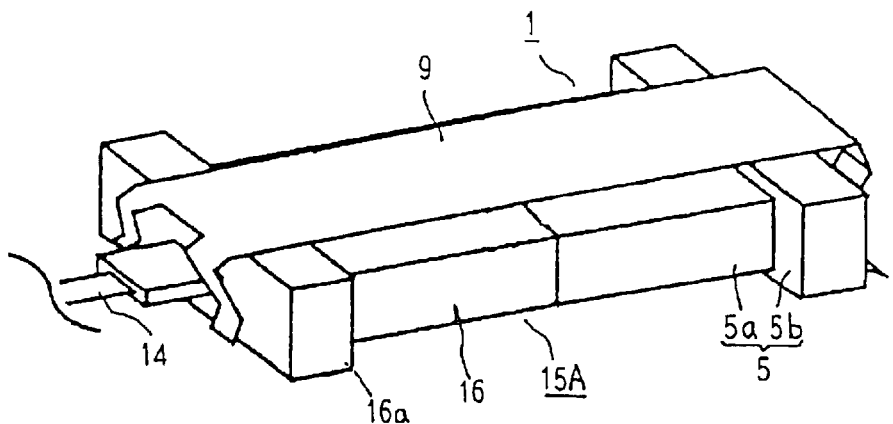
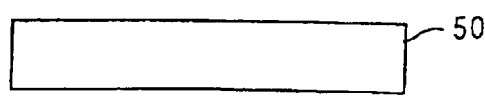
FIG. 7(a)
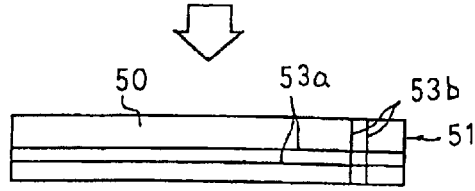
FIG. 7(b)
FIG. 7(c)
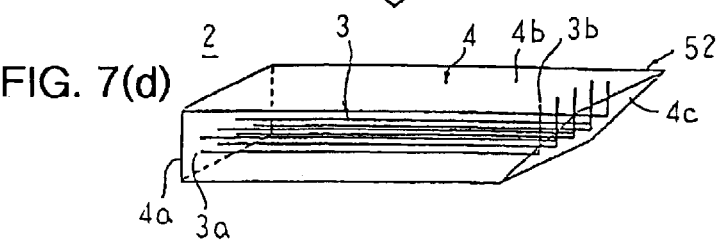
FIG. 7(d)

FIG. 8(a)
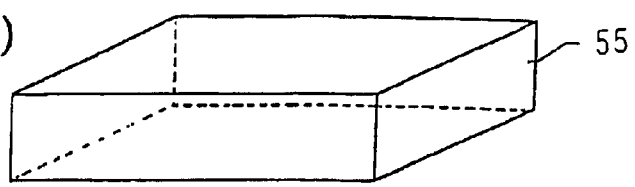
FIG. 8(b)
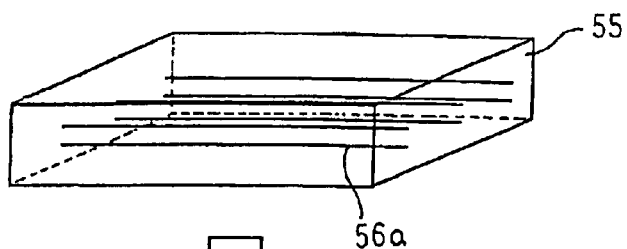
FIG. 8(c)
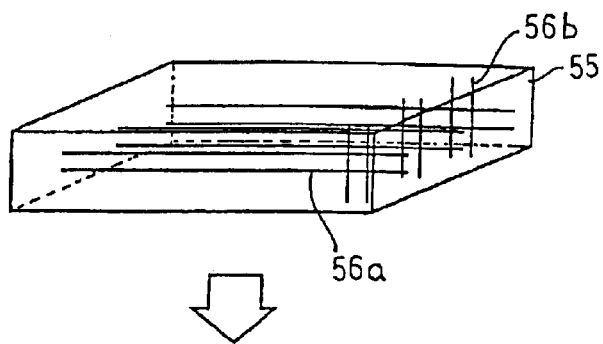
FIG. 8(d)
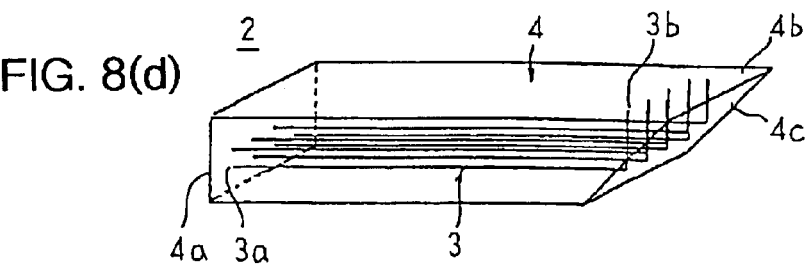

FIG. 9
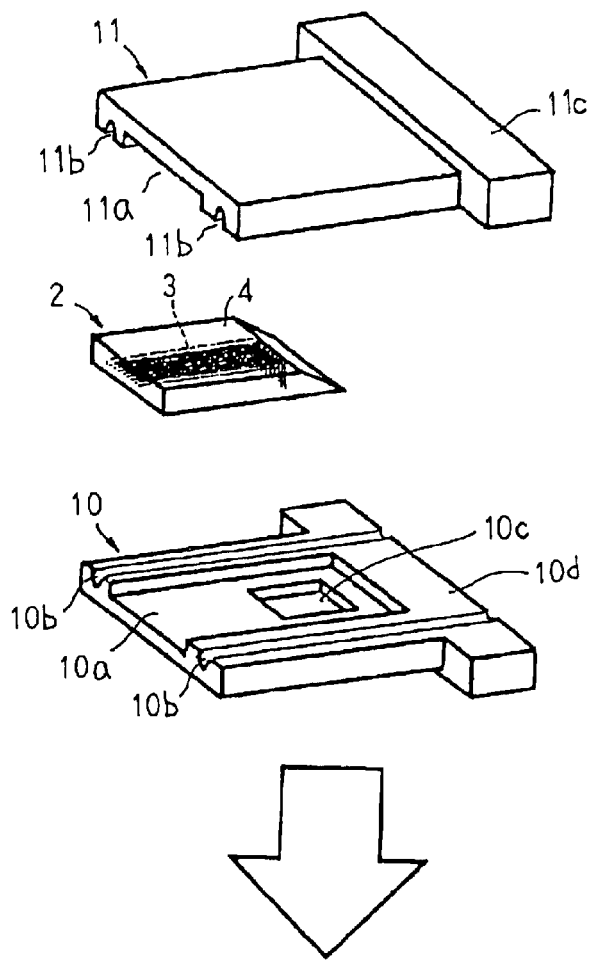
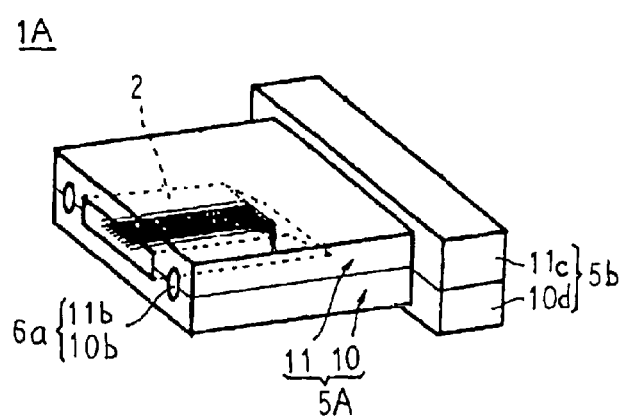

FIG. 10
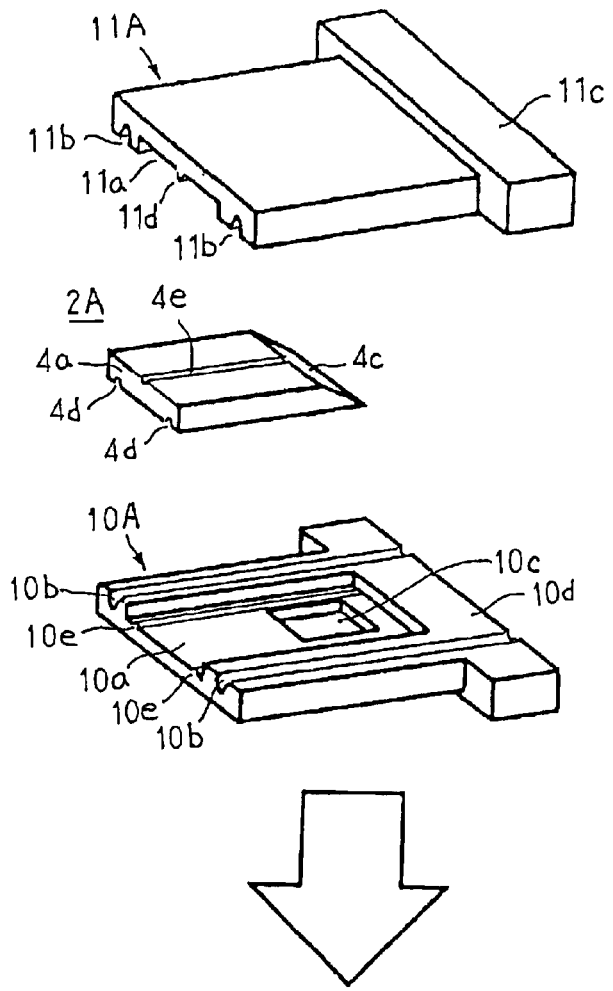
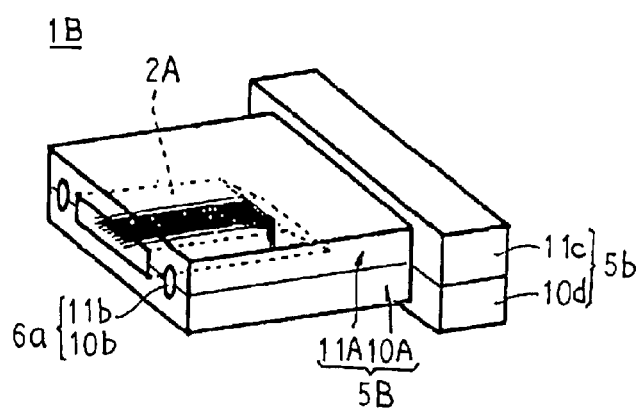

FIG. 11
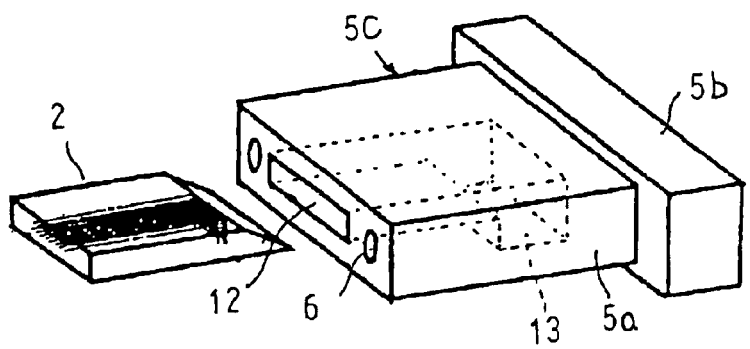
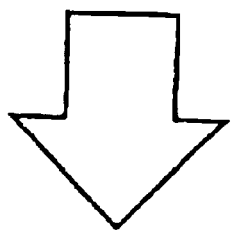
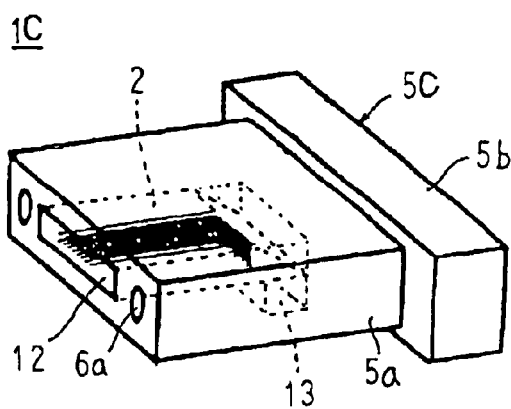

OPTICAL PATH-CHANGING CONNECTOR

BACKGROUND OF THE INVENTION

1. Field of the Invention

The present invention relates to an optical path-changing connector for easy optical connection between an optical path-changing device having cores arranged one-dimensionally or two-dimensionally and an external component having cores or optoelectronic converting elements arranged one-dimensionally or two-dimensionally.

2. Description of the Related Art

In recent years, the development of optical interconnections for signal transmission inside devices at high density is being pursued vigorously with the aim of developing massively parallel computers for parallel signal processing between high-speed, high-capacity optical communication systems, large numbers of processors, etc. When performing optical interconnections of this kind, processing of transmitted optical signals is carried out by electronic devices. In the interface devices connecting these electronic devices, hybrid optical-electrical devices are required in which optical waveguides, optoelectronic converting elements, large-scale integrated circuits (LSIs), switches, etc., for electronic control, and electric circuits for driving electronic components are combined. In order to achieve high-speed broadband communication systems, in particular, the demand for devices provided with optoelectronic converting elements such as vertical-cavity surface-emitting lasers (VCSELs), laser diodes (LDs), photo diodes (PDs), etc., has risen.

To meet this kind of demand, techniques have been proposed in which optoelectronic converting elements and optical waveguides are optically connected by disposing optical pins with micromirrors on the optoelectronic converting elements, disposing the optical waveguides in an optical printed circuit board, disposing through holes having a similar shape to the optical pins in the optical printed circuit board so as to extend to the optical waveguides, and inserting the optical pins into the through holes. (See Non-Patent Literature 1, for example.)

In this conventional optical path-changing technique, it is possible to prevent reductions in optical connection efficiency between light-emitting elements and the optical waveguides, reductions in optical connection efficiency between the optical waveguides and light-receiving elements, etc., resulting from light emitted from the light-emitting elements into free space or light emitted from the optical waveguides into free space having an angle of radiation and spreading. In addition, optical connection between the optoelectronic converting elements and the optical waveguides can be performed by a similar construction in cases where light enters the optical waveguides from light-emitting elements (optoelectronic converting elements) such as VCSELs, etc., by means of the micromirrors, and also in cases where light is emitted from the optical waveguides toward light-receiving elements (optoelectronic converting elements) such as PDs, etc.

Non-Patent Literature 1: Journal of Japan Institute of Electronics Packaging, Vol. 2, No. 5, pp. 368–372, 1999.

However, in this conventional optical path-changing technique, it is necessary to secure the micromirrored optical pins to each of the optoelectronic converting elements separately, making the manufacturing process complicated and preventing cost reductions from being achieved. Machining of the through holes formed in the optical printed circuit board is difficult, and in particular results in irregularities being formed on side surfaces of the cores of the optical waveguides, reducing optical connection efficiency between the optical waveguides and the optical pins. If the optoelectronic converting elements are arranged two-dimensionally, it is also difficult to fix all of the individual optical pins to the optoelectronic converting elements precisely, giving rise to optical axis misalignment between the optical waveguides and the optical pins, thereby leading to reductions in optical connection efficiency. In addition, pins having different lengths are required in order to optically connect the cores of the optical waveguides arranged two-dimensionally, increasing costs.

SUMMARY OF THE INVENTION

The present invention aims to solve the above problems and an object of the present invention is to provide an inexpensive optical path-changing connector having a high optical connection efficiency by providing: an optical path-changing device in which cores are disposed one-dimensionally or two-dimensionally inside a cladding; and a positioning member positionally adjusted relative to optical axes of the cores, and performing optical axis adjustment relative to an external component by means of the positioning member to suppress optical axis misalignment during the optical connection of many cores.

With the above object in view, an optical path-changing connector for optical connection to a first external component having a positioned member is provided optical waveguides or optoelectronic converting elements arranged one-dimensionally or two-dimensionally. The optical path-changing connector includes an optical path-changing device. The optical path-changing device has a cladding having a first face, a second face, and at least one mirror surface; and a plurality of cores each having a first core end surface exposed at the first face and a second core end surface exposed at the second face, each core constituting a continuous optical path extending from the first core end surface to the mirror surface, being changed in direction at the mirror surface, and extending to the second core end surface. The first core end surfaces and the second core end surfaces are arranged one-dimensionally or two-dimensionally at the first face and the second face, respectively. Further, the optical path-changing connector includes a first positioning member positionally adjusted relative to optical axes of the first core end surfaces, for positioning the first external component relative to the first core end surfaces by engaging with the positioned member.

Therefore, optical axis misalignment is suppressed during the optical connection of many cores, thereby enabling an inexpensive optical path-changing connector having a high optical connection efficiency to be achieved.

BRIEF DESCRIPTION OF THE DRAWINGS

FIG. 6 is a perspective showing an optically-connected state of the external component and the optical path-changing connector according to Embodiment 1 of the present invention;

FIGS. 7(a)–7(d) are perspective views explaining a first method for manufacturing the optical path-changing device used in the present invention;

FIGS. 8(a)–8(d) are perspective views explaining a second method for manufacturing the optical path-changing device used in the present invention;

FIG. 9 is a perspective explaining a method for manufacturing an optical path-changing device according to Inventive Example 1 of the present invention;

FIG. 10 is a perspective explaining a method for manufacturing an optical path-changing device according to Inventive Example 2 of the present invention;

FIG. 11 is a perspective explaining a method for manufacturing an optical path-changing device according to Inventive Example 3 of the present invention;

DETAILED DESCRIPTION OF THE PREFERRED EMBODIMENTS

Preferred embodiments of the present invention will now be explained with reference to the drawings.

Embodiment 1

Figure 1:
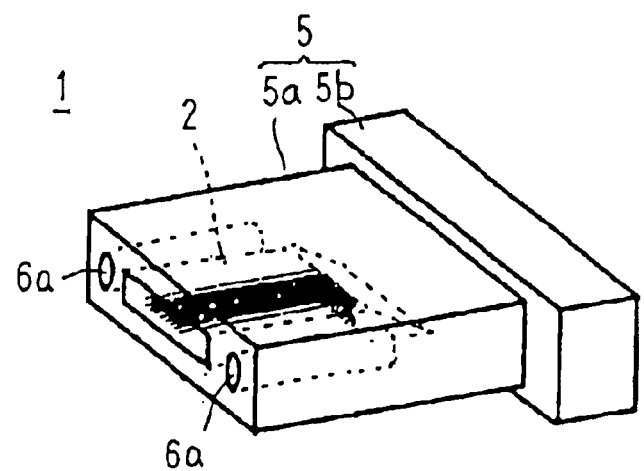
FIG. 1 is a perspective explaining a construction of an optical path-changing connector according to Embodiment 1 of the present invention.
Figure 2:
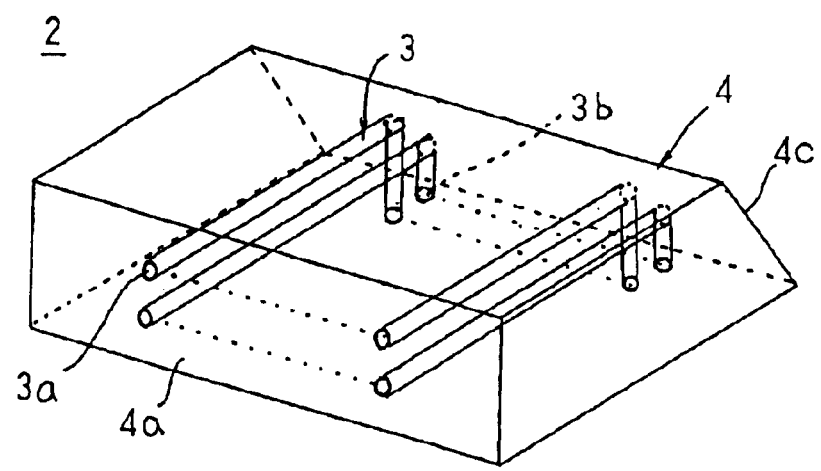
FIG. 2 is a perspective showing an optical path-changing device used in the optical path-changing connector according to Embodiment 1 of the present invention.
Figure 3:
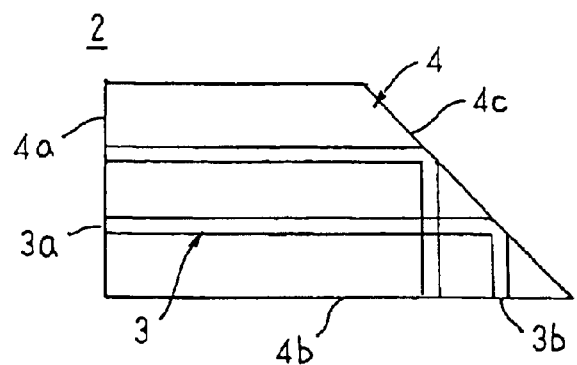
FIG. 3 is a side elevation showing the optical path-changing device used in the optical path-changing connector according to Embodiment 1 of the present invention.
Figure 4:
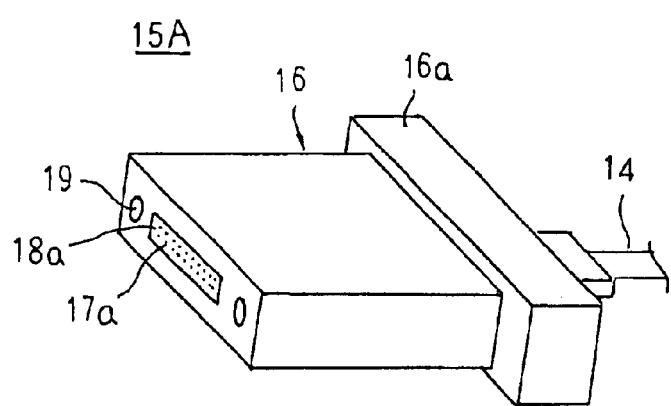
FIG. 4 is a perspective showing an external component to be optically connected to the optical path-changing connector according to Embodiment 1 of the present invention.
Figure 5:
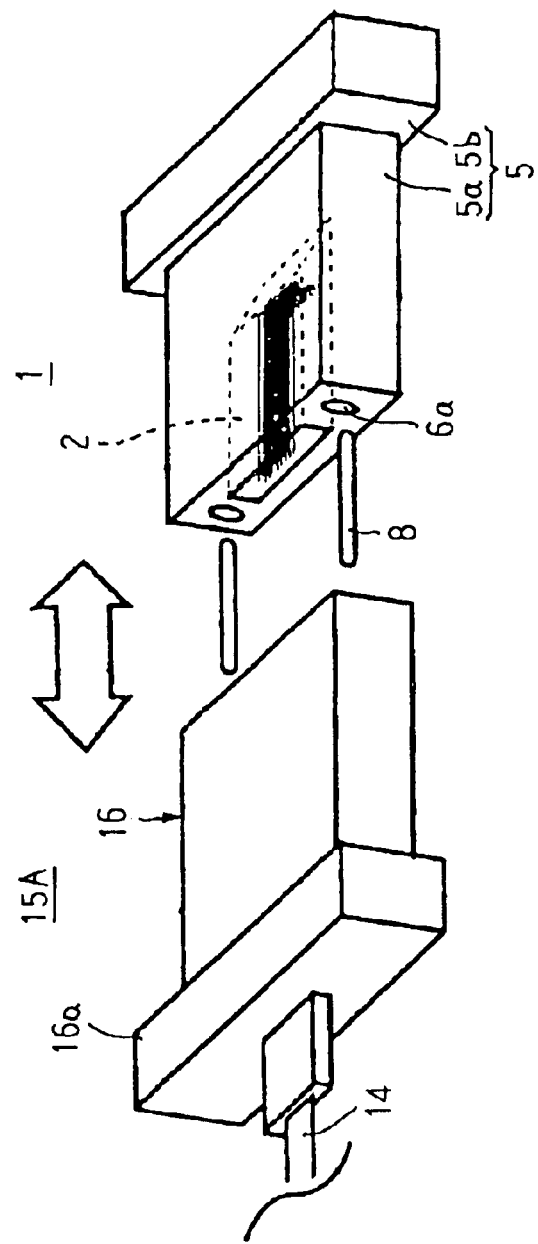
FIG. 5 is a perspective explaining a method for optically connecting the external component and the optical path-changing connector according to Embodiment 1 of the present invention.

FIG. 1 is a perspective explaining a construction of an optical path-changing connector according to Embodiment 1 of the present invention, FIGS. 2 and 3 are a perspective and a side elevation, respectively, showing an optical path-changing device used in the optical path-changing connector according to Embodiment 1 of the present invention, FIG. 4 is a perspective showing an external component optically connected to the optical path-changing connector according to Embodiment 1 of the present invention, FIG. 5 is a perspective explaining a method for optically connecting the external component and the optical path-changing connector according to Embodiment 1 of the present invention, and FIG. 6 is a perspective showing an optically-connected state of the external component and the optical path-changing connector according to Embodiment 1 of the present invention.

In FIG. 1, an optical path-changing connector 1 is provided with: an optical path-changing device 2; a device exterior casing member 5 for accommodating the optical path-changing device 2; and a pair of connector first pin insertion apertures 6a functioning as a first positioning member.

The optical path-changing device 2, as shown in FIGS. 2 and 3, is constructed by arranging two-dimensionally a plurality of device cores 3 for propagating light, and embedding the device cores 3 in a device cladding 4 having an index of refraction that is less than that of the device cores 3. The device cladding 4 has a first face 4a, a second face 4b, and a mirror surface 4c positioned between the first face 4a and the second face 4b. Each of the device cores 3 is constructed so as to extend from the first face 4a to the mirror surface 4c, be reflected at the mirror surface 4c, and extend to the second face 4b. First core end surfaces 3a of the device cores 3 are exposed in a 2-by-n matrix shape at the first face 4a, and second core end surfaces 3b are exposed in a 2-by-n matrix shape at the second face 4b. Moreover, n is an integer greater than or equal to 2.

The device exterior casing member 5 is provided with: an optical path-changing device accommodating portion 5a; and a flange portion 5b formed integrally with the optical path-changing device accommodating portion 5a. The optical path-changing device 2 is disposed inside the optical path-changing device accommodating portion 5a such that the first face 4a and the second face 4b are exposed. The pair of connector first pin insertion apertures 6a are formed in the optical path-changing device accommodating portion 5a on mutually opposite sides of the first core end surfaces 3a of the optical path-changing device 2. Each of the connector first pin insertion apertures 6a has a predetermined positional relationship relative to the two-dimensionally-arranged first core end surfaces 3a, and the aperture directions thereof are formed parallel to the optical axes of the portions of the device cores 3 extending from the first face 4a to the mirror surface 4c.

Next, a method for optically connecting a first external component 15A using an optical path-changing connector 1 constructed in this manner will be explained with reference to FIGS. 4 to 6. Here, the first external component 15A, as shown in FIG. 4, is an arrayed optical waveguide in which at least three cores (optical waveguides) are arranged two-dimensionally. A cladding of the first external component 15A in which end portions of optical fibers functioning as cores are embedded so as to be arranged two-dimensionally is housed inside an external component exterior casing member 16, an optical cable 14 in which the optical fibers are bundled leads out from the external component exterior casing member 16, and external component core end surfaces (end surfaces of the optical fibers) 17a are arranged two-dimensionally at the external component cladding end surface 18a. A pair of first external component pin insertion apertures 19 are formed in the exterior casing member 16 of the first external component 15A on mutually opposite sides of the external component cladding end surface 18a. Moreover, the external component core end surfaces 17a are arranged in an array identical to that of the first core end surfaces 3a of the optical path-changing connector 1, and the pair of first external component pin insertion apertures 19 are formed in a positional relationship that is identical to that of the pair of connector first pin insertion apertures 6a of the optical path-changing connector 1.

First, as indicated by the arrows in FIG. 5, a pair of positioning pins 8 functioning as positioned members are inserted into each of the connector first pin insertion apertures 6a of the optical path-changing connector 1. The first external component 15A is mounted to the optical path-changing connector 1 by inserting the pair of positioning pins 8 inside each of the first external component pin insertion apertures 19. Thus, the external component core end surfaces 17a in the first external component 15A are placed in close contact with the first core end surfaces 3a of the device cores 3 in the optical path-changing device 2 with the optical axes of each aligned. Next, the optical path-changing connector 1 and the first external component 15A are elastically fastened by a first spring member 9 functioning as an elastic fastening member by elastically securing the first spring member 9 to the flange portion 5b of the optical path-changing connector 1 and the flange portion 16a of the first external component 15A, as shown in FIG. 6. Thus, the external component core end surfaces 17a in the first external component 15A and the first core end surfaces 3a of the optical path-changing device 2 are optically connected so as to be maintained in a state of close contact with the optical axes of each aligned.

Thus, light entering through any one of the second core end surfaces 3b, for example, propagates to the mirror surface 4c inside the device core 3, is then reflected at the mirror surface 4c (has its optical path changed), and propagates to the first core end surface 3a inside the device core 3. Then, the light enters a corresponding core in the first external component 15A through the first core end surface 3a, propagates inside the core in the first external component 15A, and is supplied to an optical device, etc., optically connected to the first external component 15A by means of the optical cable 14.

Thus, according to Embodiment 1, because the connector first pin insertion apertures 6a are disposed in the device exterior casing member 5 such that the optical axes of the two-dimensionally-arranged first core end surfaces 3a are aligned with the optical axes of the external component core end surfaces 17a in the first external component 15A, the optical axes of the two-dimensionally-arranged cores in the first external component 15A are positionally adjusted and simultaneously optically connected to the two-dimensionally-arranged cores 3 of the optical path-changing device 2 simply by inserting the positioning pins 8 of the first external component 15A into the connector first pin insertion apertures 6a. Thus, workability when connecting the optical path-changing connector 1 to the first external component 15A is facilitated, and optical connection loss resulting from optical axis misalignment is reduced.

Because the optical path-changing connector 1 and the first external component 15A are elastically fastened using the first spring member 9, the external component core end surfaces 17a in the first external component 15A and the first core end surfaces 3a of the optical path-changing device 2 are maintained in a state of close contact with the optical axes of each aligned. Thus, contact between the external component core end surfaces 17a of the first external component 15A and the first core end surfaces 3a of the optical path-changing device 2 is improved, enabling loss during connection to be reduced.

Because the optical path-changing device 2 is accommodated inside the device exterior casing member 5, damage to the optical path-changing device 2 is suppressed, enabling durability to be improved.

By adopting the present connector construction, difficult-to-manufacture optical through holes and optical pins are no longer necessary, enabling manufacturing costs to be significantly lowered, enabling optical connection efficiency to be increased, and also enabling durability to be increased.

Moreover, there is a risk that scratching, etc., may occur at the connecting surface of the optical path-changing connector 1 with the first external component 15A as a result of mounting and removal of the first external component 15A. There may also be problems of reflection at the connecting surface. Thus, the occurrence of scratching, reflection, etc., may also be prevented by forming hard coating films, anti-reflection films, etc., on the first face 4a and the second face 4b. Resin materials such as epoxy, acryl, or silicone resins, etc., or inorganic materials such as silica, alumina, etc., for example, can be used for the materials in the hard coating films, the anti-reflection films, etc.

To suppress the influence of reflection at the connecting surface of the optical path-changing connector 1 with the first external component 15A, regions of the first face 4a and the second face 4b including at least the first core end surfaces 3a and the second core end surfaces 3b may also be inclined by a predetermined amount relative to the optical axes of the device cores 3. It is desirable for the angle of this inclination to be 8 degrees, but the angle is not limited to 8 degrees provided that it enables the influence of reflection to be suppressed in the connected state.

In Embodiment 1 above, the positioning pins 8 are explained as being independent parts, but the positioning pins 8 may also be inserted into, fixed to, and integrated with either the connector first pin insertion apertures 6a of the optical path-changing connector 1 or the pin insertion apertures 19 of the first external component 15A beforehand.

First and second methods for manufacturing the optical path-changing device 2 used in the present invention will now be explained with reference to FIGS. 7 and 8, respectively.

First, the first method for manufacturing an optical path-changing device, in FIG. 7, will be explained.

As shown in FIG. 7(a), a flat substrate 50 is prepared using a silica glass. Then, a first fluorinated polyimide solution having a low index of refraction is spin-coated onto the silica substrate 50 and is baked to form a first cladding layer. Next, a second fluorinated polyimide solution having a high index of refraction is spin-coated and baked to form a core layer on the first cladding layer.

Then, a photoresist is applied to the core layer, the photoresist is patterned by a photoengraving technique, and then unwanted portions of the core layer are removed by means of reactive ion etching. Then, two first and two second core segments 53a and 53b composed of the core layer are obtained by removing the photoresist. Next, the first fluorinated polyimide solution is spin-coated and baked to form a second cladding layer.

Thus, as shown in FIG. 7(b), a waveguide body 51 is obtained in which the two first and the two second core segments 53a and 53b are embedded in the first and second cladding layers. The two first core segments 53a are formed into straight, parallel lines, the two second core segments 53b are formed into straight, parallel lines, and the first core segments 53a and the second core segments 53b are perpendicular to each other. Intersecting portions of the first and second core segments 53a and 53b are positioned in a straight line.

Then, as shown in FIG. 7(c), n waveguide bodies 51 are superposed with the first and second core segments 53a and 53b aligned. Next, a waveguide unit 52 is prepared by laminating together the n waveguide bodies 51, and then a mirror surface 4c is formed by dicing the waveguide unit 52 at the positions of intersection between the first and second core segments 53a and 53b to obtain the optical path-changing device 2 shown in FIG. 7(d). Thus, the mirror surface 4c is formed so as to pass through the points of intersection between the optical axes of the first core segments 53a and the optical axes of the second core segments 53b.

In this optical path-changing device 2, each of the device cores 3 is constructed so as to extend from the first face 4a to the mirror surface 4c, be reflected at the mirror surface 4c, and extend to the second face 4b. First core end surfaces 3a of the device cores 3 are exposed in a 2-by-n matrix shape at the first face 4a, and second core end surfaces 3b are exposed in a 2-by-n matrix shape at the second face 4b. The device cores 3 prepared in this manner are each formed with a rectangular cross section.

Moreover, in this first method for manufacturing an optical path-changing device, the index of refraction of the second fluorinated polyimide solution is set 0.01 to 5.00 percent (%) higher than the index of refraction of the first fluorinated polyimide solution. Furthermore, fluorinated polyimides are used for the core and cladding materials, but a polymethyl methacrylate resin, a silicone resin, an epoxy resin, a polysilane resin, etc., can be used for the core and cladding materials provided that the resin achieves the required index of refraction. In addition, the core layer is patterned by reactive ion etching, but if the second fluorinated polyimide solution is imparted with photocuring properties, the core layer can be patterned by a photoengraving technique alone, enabling simplification of the manufacturing process.

In this first method for manufacturing an optical path-changing device, a silica glass is used for the substrate 50, but the substrate 50 is not limited to a silica glass substrate and, for example, a silicon substrate, or a resin substrate composed of a polyimide resin, an acrylic resin, an epoxy resin, etc., is also acceptable.

In this first method for manufacturing an optical path-changing device, the waveguide bodies 51 are prepared by applying first and second fluorinated polyimide solutions to a silica glass substrate 50, preparing first and second core segments 53a and 53b by patterning using reactive ion etching, and finally applying the first fluorinated polyimide solution. However, waveguide bodies may also be prepared by using a silica glass having a low index of refraction for the substrate, forming a film of a silica glass having a high index of refraction on the substrate using a vacuum film-formation technique such as sputtering, etc., preparing first and second core segments by using photoengraving techniques and reactive ion etching techniques to pattern the silica glass film having the high index of refraction, and thereafter forming a film of a silica glass having a low index of refraction on the substrate so as to cover the first and second core segments using a vacuum film-formation technique such as sputtering, etc. In that case, any glass achieving the required index of refraction, such as a germanium-doped glass, a borosilicate glass, a soda glass, for example, can be used instead of the silica glass.

Next, the second method for manufacturing an optical path-changing device, in FIG. 8, will be explained.

As shown in FIG. 8(a), a flat substrate 55 is prepared using a halide glass. Then, an 810-nm laser beam, for example, is condensed by a condenser lens, and is focused at a predetermined depth position in the substrate 55 with an energy of 100 MJ/cm$^2$. This laser irradiation gives rise to a change in the index of refraction of the laser-irradiated portion of the halide glass. At this time, a single first core segment 56a is formed by moving the substrate 55 in a straight line. Then, by performing laser irradiation a plurality of times and offsetting the focal position each time, first core segments 56a arranged two-dimensionally (2 by n) so as to be parallel to each other, as shown in FIG. 8(b), are formed inside the substrate 55.

Next, by moving the substrate 55 in a straight line in a direction perpendicular to the first core segments 56a and performing laser irradiation, second core segments 56b arranged two-dimensionally (2 by n) so as to be parallel to each other, as shown in FIG. 8(c), are further formed inside the substrate 55 so as to perpendicular to the first core segments 56a.

Then, a mirror surface 4c is formed by dicing the substrate 55 at the positions of intersection between the first and second core segments 56a and 56b to obtain the optical path-changing device 2 shown in FIG. 8(d).

In the optical path-changing device 2 prepared in this manner, device cores 3 (portions of the halide glass where the change in the index of refraction has occurred) are embedded inside a cladding 4 (portions of the halide glass where the change in the index of refraction has not occurred). The index of refraction of the device cores 3 is set 0.01 to 5.00 percent (%) higher than the index of refraction of the cladding 4. The device cores 3 prepared in this manner are each formed with a circular cross section, enabling light to propagate efficiently.

In this optical path-changing device 2, each of the device cores 3 is also constructed so as to extend from the first face 4a to the mirror surface 4c, be reflected at the mirror surface 4c, and extend to the second face 4b. First core end surfaces 3a of the device cores 3 are exposed in a 2-by-n matrix shape at the first face 4a, and second core end surfaces 3b are exposed in a 2-by-n matrix shape at the second face 4b.

Moreover, in this second method for manufacturing an optical path-changing device, the material for the substrate 55 is not limited to a halide glass, and for example, an oxide glass, a silica glass, etc., can be used provided that a change in the index of refraction can be brought about by laser irradiation.

In the above first and second methods for manufacturing an optical path-changing device, the flatness of the mirror surface 4c may also be increased by polishing the diced surface. A mirror surface may also be formed by means of reactive ion etching, polishing, etc., instead of dicing.

In the above first and second methods for manufacturing an optical path-changing device, the index of refraction of the device cores 3 is set 0.01 to 5.00 percent (%) higher than the index of refraction of the cladding 4, but the difference between the indices of refraction of the two is not limited to 0.01 to 5.00 percent (%) and may be arbitrarily set to match the intended use.

The optical path-changing device used in the present invention is not limited to an optical path-changing device manufactured by the above first and second manufacturing methods and for example, an optical path-changing device constructed by bundling optical fibers so as to be arranged two-dimensionally is also acceptable.

In the optical path-changing device 2, light propagating through the device cores 3 may also be reflected at the mirror surface 4c efficiently by coating gold or a multilayer film onto the mirror surface 4c.

The mirror surface 4c may also be provided with a filtering function. In that case, light passing through the mirror surface 4c can be inserted into a separate waveguide, increasing the number of possible uses.

In addition, if the angle of the mirror surface 4c relative to the optical axes of the segments of the device cores 3 is set to 45 degrees (45°), the optical path can be changed by 90 degrees (90°). This angle of the mirror surface 4c relative to the optical axes of the segments of the device cores 3 is not limited to 45 degrees (45°) and should be set appropriately to match the intended use.

Next, methods for manufacturing optical path-changing connectors will be explained in detail.

INVENTIVE EXAMPLE 1

FIG. 9 is a perspective explaining a method for manufacturing an optical path-changing device according to Inventive Example 1 of the present invention.

A device exterior casing member 5A, as shown in FIG. 9, is constructed so as to be divided into a first exterior casing member division 10 and a second exterior casing member division 11. A first accommodating recess portion 10a is formed in a first surface of the first exterior casing member division 10, a first pair of grooves 10b are formed parallel to each other in the first surface on mutually opposite sides of the first accommodating recess portion 10a, an optical entrance-exit window 10c is disposed through the accommodating recess portion 10a, and a first flange portion 10d is formed on the first exterior casing member division 10. A second accommodating recess portion 11a is formed in a first surface of the second exterior casing member division 11, a second pair of grooves 11b are formed parallel to each other in the first surface on mutually opposite sides of the second accommodating recess portion 11a, and a second flange portion 11c is formed on the second exterior casing member division 11. Moreover, a groove spacing between the second pair of grooves 11b matches a groove spacing between the first pair of grooves 10b.

The optical path-changing device 2 is fixed to the accommodating recess portion 11a by applying an ultraviolet-cured adhesive and disposing the optical path-changing device 2 inside the accommodating recess portion 11a, positionally adjusting the optical axes, and then curing the adhesive by irradiating it with ultraviolet rays. At this time, the optical axes of the optical path-changing device 2 are positionally adjusted using a bonding surface as a reference plane by adjusting the distance from this reference plane to the device cores 3 so as to be constant, and adjusting the distance between the device cores 3 and the grooves 11b to a predetermined value.

Next, an optical path-changing connector 1A is assembled by placing the first exterior casing member division 10 on the second exterior casing member division 11 such that the optical path-changing device 2 is housed inside the accommodating recess portion 10a, and securely fastening the first exterior casing member division 10 and the second exterior casing member division 11 by a nut and bolt (not shown).

In the optical path-changing connector 1A assembled in this manner, the two-dimensionally-arranged second core end surfaces 3b of the optical path-changing device 2 are exposed inside the window 10c. Then, the optical path-changing connector 1A is optically connected to external components by means of the first core end surfaces 3a and the second core end surfaces 3b. Together the first and second grooves 10b and 11b constitute the connector first pin insertion apertures 6a.

In Inventive Example 1, because the device exterior casing member 5A is constructed so as to be divided into first and second exterior casing member divisions 10 and 11, the optical axis adjustment operation is facilitated when mounting the optical path-changing device 2 to the device exterior casing member 5A.

Moreover, in Inventive Example 1 above, the optical path-changing device 2 is mounted to the second exterior casing member division 11 while positionally adjusting the optical axes, but the optical path-changing device 2 may also be mounted to the first exterior casing member division 10 while positionally adjusting the optical axes.

The device exterior casing member 5A is divided into two pieces, namely the first and second exterior casing member division 10 and 11, but the number of pieces is not limited to two and there may also be three or more.

The first and second the exterior casing member division 10 and 11 is fastened using a nut and bolt, but the method for fastening the first and second the exterior casing member division 10 and 11 is not limited to the nut and bolt and for example, may also be an adhesive.

INVENTIVE EXAMPLE 2

FIG. 10 is a perspective explaining a method for manufacturing an optical path-changing device according to Inventive Example 2 of the present invention.

A device exterior casing member 5B, as shown in FIG. 10, is constructed so as to be divided into a first exterior casing member division 10A and a second exterior casing member division 11A. A first accommodating recess portion 10a is formed in a first surface of the first exterior casing member division 10A, a first pair of grooves 10b are formed parallel to each other in the first surface on mutually opposite sides of the first accommodating recess portion 10a, an optical entrance-exit window 10c is disposed through the accommodating recess portion 10a, a first flange portion 10d is formed on the first exterior casing member division 10A, and a pair of first optical path-changing device positioning lugs 10e (first engaging portions) are disposed so as to extend parallel to the grooves 10b in the first accommodating recess portion 10a. A second accommodating recess portion 11a is formed in a first surface of the second exterior casing member division 11A, a second pair of grooves 11b are formed parallel to each other in the first surface on mutually opposite sides of the second accommodating recess portion 11a, and a second flange portion 11c is formed on the second exterior casing member division 11A, and a second optical path-changing device positioning lug 11d (a second engaging portion) is disposed so as to extend parallel to the grooves 11b in the second accommodating recess portion 11a.

In an optical path-changing device 2A, a pair of first optical path-changing device positioning grooves 4d (first receiving portions) are disposed in the second face 4b of the device cladding 4 so as to extend parallel to the device cores 3, and a second optical path-changing device positioning groove 4e (second receiving portion) is disposed so as to extend parallel to the device cores 3 in a face on an opposite side of the device cladding 4 from the second face 4b. The distance between the pair of the first optical path-changing device positioning grooves 4d matches the distance between the pair of first optical path-changing device positioning lugs 10e. The positional relationship between the pair of first optical path-changing device positioning grooves 4d and the second optical path-changing device positioning groove 4e matches the positional relationship between the pair of the first optical path-changing device positioning lugs 10e and the second optical path-changing device positioning lug 11d.

The optical path-changing device 2A is disposed inside the accommodating recess portion 10a by applying an ultraviolet-cured adhesive and engaging the pair of first optical path-changing device positioning grooves 4d with the pair of first optical path-changing device positioning lugs 10e. Then, the second exterior casing member division 11A is placed on the first exterior casing member division 10A such that the optical path-changing device 2A is housed inside the second accommodating recess portion 11a, and the second optical path-changing device positioning lug 11d is engaged in the second optical path-changing device positioning groove 4e. Then, the adhesive is cured by irradiating it with ultraviolet rays to fix the optical path-changing device 2A, the first exterior casing member division 10A and the second exterior casing member division 11A together, thereby completing assembly of an optical path-changing connector 1B.

Thus, the optical axes of the optical path-changing device 2A are positionally adjusted by engagement of the pair of first optical path-changing device positioning grooves 4d and the pair of first optical path-changing device positioning lugs 10e, and by engagement of the second optical path-changing device positioning groove 4e and the second optical path-changing device positioning lug 11d.

Consequently, in Inventive Example 2, because the optical axes are positionally adjusted by engagement of the pair of first optical path-changing device positioning grooves 4d and the pair of first optical path-changing device positioning lugs 10e, and by engagement of the second optical path-changing device positioning groove 4e and the second optical path-changing device positioning lug 11d, the operation for fixing the optical path-changing device 2A is facilitated and displacement of the optical path-changing device 2A after optical axis adjustment is eliminated, maintaining the optical axis adjustment of the optical path-changing device 2A for an extended period.

Here, if the first and second exterior casing member divisions 10A and 11A are prepared using a resin material or an inorganic material, the lugs 10e and 11d can be molded simultaneously during molding of the first and second exterior casing member divisions 10A and 11A. If the first and second exterior casing member divisions 10A and 11A are prepared using a metal material, the lugs 10e and 11d can be formed by machining, etc.

Moreover, in Inventive Example 2 above, optical axis adjustment of the optical path-changing device 2A is performed by three engaging portions constituted by the first and second lugs 10e and 11d and the first and second grooves 4d and 4e, but the number of the engaging portions constituted by the first and second lugs 10e and 11d and the first and second grooves 4d and 4e is not limited to three, and the number of engaging portions need only be sufficient to enable the optical path-changing device 2A to be positioned in the device exterior casing member accurately.

In Inventive Example 2 above, the lugs are formed on the first and second exterior casing member divisions 10A and 11A and the grooves are formed in the optical path-changing device 2A, but the lugs may also be formed on the optical path-changing device and the grooves formed in the first and second exterior casing member divisions 10A and 11A. The lugs and the grooves may also be formed in the first and second exterior casing member divisions 10A and 11A and the optical path-changing device 2A in other combinations.

INVENTIVE EXAMPLE 3

FIG. 11 is a perspective explaining a method for manufacturing an optical path-changing device according to Inventive Example 3 of the present invention.

In a device exterior casing member 5C, as shown in FIG. 11, an accommodating aperture 12 functioning as an optical path-changing device insertion aperture is formed in an optical path-changing device accommodating portion 5a, and a window 13 is formed at an end portion of the accommodating aperture 12.

An optical path-changing connector 1C is assembled by applying an ultraviolet-cured adhesive and inserting the optical path-changing device 2 inside the accommodating aperture 12, positionally adjusting the optical axes, and then fixing the optical path-changing device 2 to a surface of the accommodating aperture 12 by curing the adhesive by irradiating it with ultraviolet rays. At this time, the optical axes of the optical path-changing device 2 are positionally adjusted using a bonding surface as a reference plane by adjusting the distance from this reference plane to the device cores 3 so as to be constant, and adjusting the distance between the device cores 3 and the connector first pin insertion apertures 6a to a predetermined value.

In the optical path-changing connector 1C assembled in this manner, the two-dimensionally-arranged second core end surfaces 3b of the optical path-changing device 2 are exposed inside the window 13. Then, the optical path-changing connector 1C is optically connected to external components by means of the first core end surfaces 3a and the second core end surfaces 3b.

In Inventive Example 3, because the accommodating aperture 12 for inserting the optical path-changing device 2 is formed in the optical path-changing device accommodating portion 5a of the device exterior casing member 5C, optical axis adjustment can be preformed with the optical path-changing device 2 inserted into the accommodating aperture 12, facilitating the operation of positionally adjusting the optical axes of the optical path-changing device 2. In addition, because the number of parts is reduced, assembly man-hours are reduced, enabling cost reductions.

Moreover, in each of the above Inventive Examples, the optical path-changing device is fixed to the exterior casing member using an ultraviolet-cured adhesive, but the method for fixing the optical path-changing device is not limited to an ultraviolet-cured adhesive and, for example, thermosetting adhesives, dealcohol type adhesives, etc., may also be used.

In each of the above Inventive Examples, the material of the exterior casing member is not specifically described, but the material of the exterior casing member need simply be a material satisfying strength and scratch resistance requirements for a connector, and resin materials such as epoxy, acrylic, or silicone resins, etc., inorganic materials such as glasses, zirconia, etc., metal materials or alloy materials such as stainless alloys, iron, etc., or any of these materials with a filler added can be used.

Embodiment 2

Figure 12:
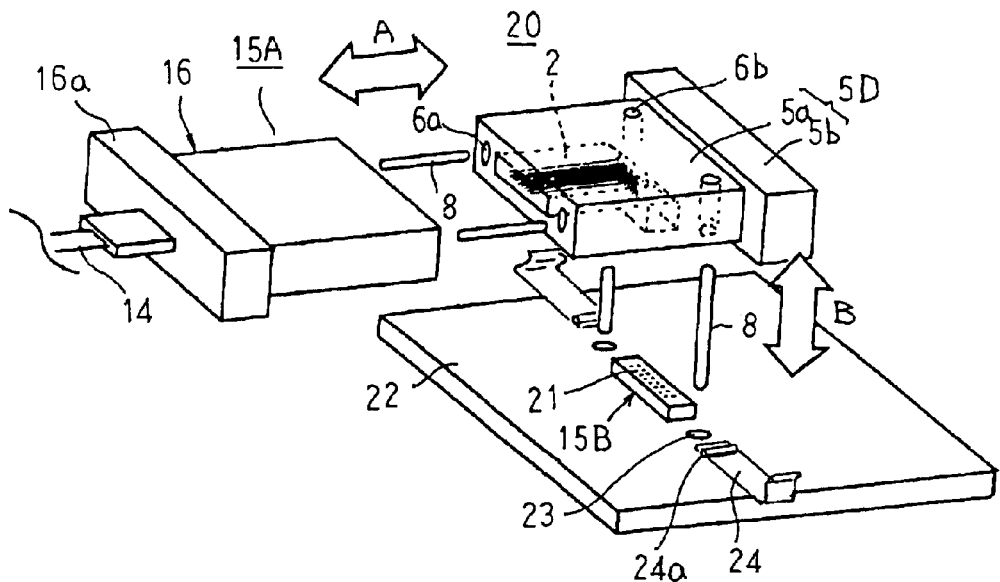
FIG. 12 is a perspective explaining a method for optically connecting external components and an optical path-changing connector according to Embodiment 2 of the present invention.
Figure 13:
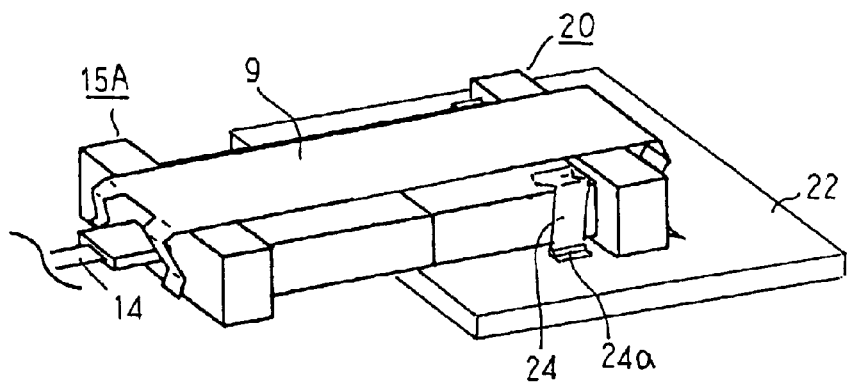
FIG. 13 is a perspective showing an optically-connected state of the external components and the optical path-changing connector according to Embodiment 2 of the present invention.

FIG. 12 is a perspective explaining a method for optically connecting external components and an optical path-changing connector according to Embodiment 2 of the present invention, and FIG. 13 is a perspective showing an optically-connected state of the external components and the optical path-changing connector according to Embodiment 2 of the present invention.

In FIG. 12, in an optical path-changing connector 20, a pair of connector second pin insertion apertures 6b functioning as a second positioning member are formed in an optical path-changing device accommodating portion 5a of a device exterior casing member 5D so as to have a predetermined positional relationship relative to two-dimensionally-arranged second core end surfaces 3b, and such that the aperture directions thereof are formed parallel to the optical axes of portions of device cores 3 extending from a second face 4b to a mirror surface 4c.

Moreover, the device exterior casing member 5D in Embodiment 2 is similar to the device exterior casing member 5C in Embodiment 1 above, for example, but is additionally formed with connector second pin insertion apertures 6b. This optical path-changing connector 20 is constructed in a similar manner to the optical path-changing connector 1 in Embodiment 1 above except for the fact that this device exterior casing member 5D is used instead of the device exterior casing member 5C from Embodiment 1 above.

A second external component 15B is an arrayed optoelectronic converting element body constructed by arranging three or more optoelectronic converting elements 21 two-dimensionally, the second external component 15B being mounted to a circuit board 22. The optoelectronic converting elements 21 are arranged into an identical arrangement to the second core end surfaces 3b of the optical path-changing device 2. A pair of circuit board pin insertion apertures 23 functioning as positioned members are formed into the circuit board 22 so as to have a predetermined positional relationship relative to the two-dimensionally-arranged optoelectronic converting elements 21. In addition, spring members 24 functioning as an elastic fastening member are mounted to the circuit board 21 so as to be pivotable about hinges 24a.

Here, the elements constituting the optoelectronic converting elements 21 arranged two-dimensionally in the second external component 15B may be either light-emitting elements or light-receiving elements. The light-emitting elements and the light-receiving elements should be elements capable of emitting or receiving light and performing photoelectric conversion, and vertical-cavity surface-emitting lasers (VCSELs), end-emitting laser diodes (LDs), for example, can be used for the light-emitting elements, and photo diodes (PDs), for example, can be used for the light-receiving elements.

Next, a method for optically connecting first and second external components 15A and 15B using an optical path-changing connector 20 constructed in this manner will be explained.

First, as indicated by the arrows A in FIG. 12, a pair of positioning pins 8 are inserted into each of the connector first pin insertion apertures 6a of the optical path-changing connector 20. The first external component 15A is mounted to the optical path-changing connector 20 by inserting the pair of positioning pins 8 inside each of the first external component pin insertion apertures 19. Thus, the external component core end surfaces 17a in the first external component 15A are placed in close contact with the first core end surfaces 3a of the device cores 3 of the optical path-changing device 2 with the optical axes of each aligned. Next, the optical path-changing connector 20 and the first external component 15A are elastically fastened by a first spring member 9 by elastically securing the first spring member 9 to the flange portion 5b of the optical path-changing connector 20 and the flange portion 16a of the first external component 15A, as shown in FIG. 13. Thus, the external component core end surfaces 17a in the first external component 15A and the first core end surfaces 3a in the optical path-changing device 2 are optically connected so as to be maintained in a state of close contact with the optical axes of each aligned.

Next, as indicated by the arrows B in FIG. 12, a pair of positioning pins 8 are inserted into each of the circuit board pin insertion apertures 23 of the circuit board 22. The optical path-changing connector 20 is mounted to the circuit board 22 by inserting the pair of positioning pins 8 inside each of the connector second pin insertion apertures 6b. Thus, the optoelectronic converting elements 21 in the second external component 15B are inserted inside the window 13 of the device exterior casing member 5D and placed in close contact with the second core end surfaces 3b of the device cores 3 of the optical path-changing device 2 with the optical axes of each aligned. Next, the optical path-changing connector 20 and the second external component 15B are elastically fastened by the second spring members 24 by elastically securing the second spring members 24 to the optical path-changing device accommodating portion 5a of the optical path-changing connector 20, as shown in FIG. 13.

Thus, the optoelectronic converting elements 21 in the second external component 15B and the second core end surfaces 3b in the optical path-changing device 2 are optically connected so as to be maintained in a state of close contact with the optical axes of each aligned.

As a result, the external component core end surfaces 17a in the first external component 15A and the optoelectronic converting elements 21 in the second external component 15B are optically connected by means of the optical path-changing connector 20.

Thus, if the optoelectronic converting elements 21 are light-emitting elements, light emitted by any one of the optoelectronic converting elements 21 enters through the corresponding second core end surface 3b, propagates to the mirror surface 4c inside the device core 3, is then reflected at the mirror surface 4c, and propagates to the first core end surface 3a inside the device core 3. Then, the light enters a corresponding core in the first external component 15A through the first core end surface 3a, propagates inside the core in the first external component 15A, and is supplied to an optical device, etc., optically connected to the first external component 15A by means of the optical cable 14.

If the optoelectronic converting elements 21 are light-receiving elements, light entering from the external component core end surfaces 17a of the first external component 15A through any one of the first core end surfaces 3a propagates to the mirror surface 4c inside the device core 3, is then reflected at the mirror surface 4c, and propagates to the second core end surface 3b inside the device core 3. Then, the light enters a corresponding optoelectronic converting element in the second external component 15B through the second core end surface 3b, is converted to a quantity of electricity by the optoelectronic converting elements 21, and is output to desired equipment by means of the circuit board 22.

Thus, according to Embodiment 2, in addition to the effects of Embodiment 1 above, because the connector second pin insertion apertures 6b are disposed in the device exterior casing member 5D such that centers (optical axes) of the two-dimensionally-arranged second core end surfaces 3b are aligned with the optical axes of the optoelectronic converting elements 21 in the second external component 15B, the optical axes of the two-dimensionally-arranged optoelectronic converting elements 21 in the second external component 15B are positionally adjusted and simultaneously optically connected to the two-dimensionally-arranged cores 3 of the optical path-changing device 2 simply by inserting the positioning pins 8 of the second external component 15B into the connector second pin insertion apertures 6b. Thus, workability when connecting the optical path-changing connector 20 to the second external component 15B is facilitated, and optical connection loss resulting from optical axis misalignment is reduced.

Because the optical path-changing connector 20 and the second external component 15B are elastically fastened using the second spring members 24, the optoelectronic converting elements 21 in the second external component 15B and the second core end surfaces 3b of the optical path-changing device 2 are maintained in a state of close contact with the optical axes of each aligned. Thus, contact between the optoelectronic converting elements 21 in the second external component 15B and the second core end surfaces 3b of the optical path-changing device 2 is improved, enabling loss during connection to be reduced.

The wavelengths able to be handled by the optoelectronic converting elements 21 are generally 0.85 $\mu$m, 1.3 $\mu$m, and 1.55 $\mu$m but any wavelength can be used in this optical path-changing connector 20 depending on what device it is applied to.

The second external component 15B is constructed such that elements that are either light-emitting elements or light-receiving elements are arranged two-dimensionally, but an external component constructed such that a combination of light-emitting elements and light-receiving elements are arranged two-dimensionally is also acceptable.

In Embodiment 2, a device exterior casing member 5D is used in which connector second pin insertion apertures 6b are formed in a device exterior casing member 5C such as in Inventive Example 3 of Embodiment 1 above, but a device exterior casing member may also be used in which connector second pin insertion apertures 6b are formed in device exterior casing members 5A or 5B from Inventive Example 1 or 2 of Embodiment 1 above.

Embodiment 3

Figure 14:
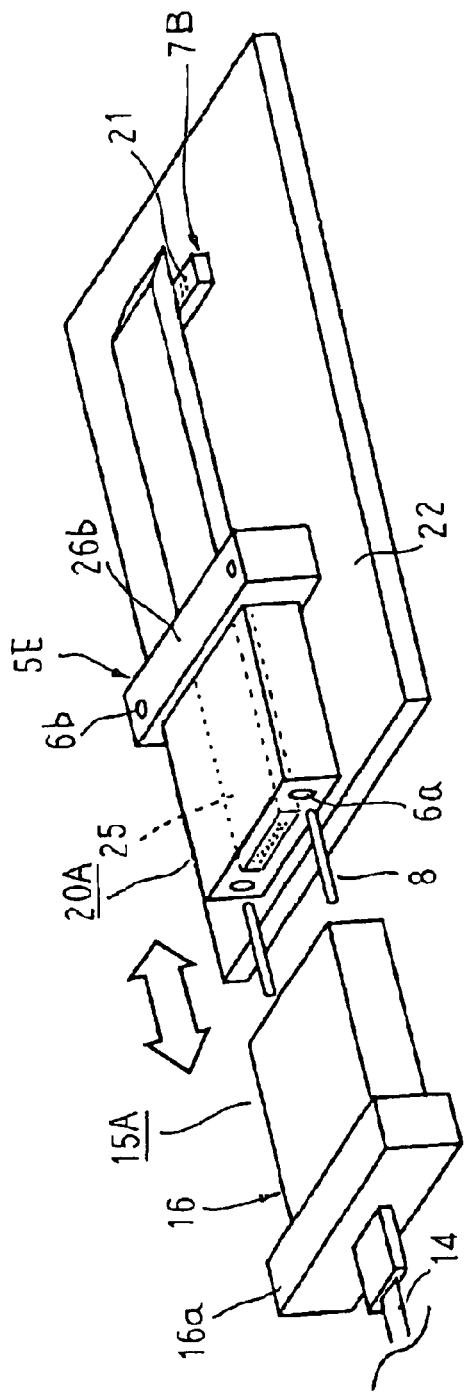
FIG. 14 is a perspective explaining a method for optically connecting external components and an optical path-changing connector according to Embodiment 3 of the present invention.

FIG. 14 is a perspective explaining a method for optically connecting external components and an optical path-changing connector according to Embodiment 3 of the present invention.

In FIG. 14, an optical path-changing device 25 is constructed in a similar manner to the optical path-changing device 2 above except for the fact that a distance from the first face 4a of the device cladding 4 to the mirror surface 4c is longer. This optical path-changing device 25 is mounted to a device exterior casing member 5E such that the mirror surface 4c projects outside. The device exterior casing member 5E is achieved, for example, by omitting the window 10c from the first and second exterior casing member divisions 10 and 11 shown in FIG. 9, forming first and second accommodating recess portions 10a and 11a so as to penetrate through the flange portions 10d and 11c, and disposing connector second pin insertion apertures 6b through the flange portions 10d and 11c.

In an optical path-changing connector 20A constructed in this manner, a pair of positioning pins 8 are inserted into connector first pin insertion apertures 6a of the optical path-changing connector 20A. A first external component 15A is mounted to the optical path-changing connector 20A by inserting the pair of positioning pins 8 inside first external component pin insertion apertures.

A pair of positioning pins 8 are inserted into circuit board pin insertion apertures 23 of the circuit board 22. The optical path-changing connector 20A is mounted to the circuit board 22 by inserting the pair of positioning pins 8 inside each of the connector second pin insertion apertures 6b.

Thus, the external component core end surfaces 17a in the first external component 15A are placed in close contact with the first core end surfaces 3a of the device cores 3 of the optical path-changing device 25 with the optical axes of each aligned. Similarly, the optoelectronic converting elements 21 in the second external component 15B are placed in close contact with the second core end surfaces 3b of the device cores 3 of the optical path-changing device 25 with the optical axes of each aligned.

Next, although not shown, the external component core end surfaces 17a in the first external component 15A and the optoelectronic converting elements 21 in the second external component 15B are optically connected by means of the optical path-changing connector 20A by elastically securing a first spring member 9 to a flange portion 26b of the optical path-changing connector 20A and the flange portion 16a of the first external component 15A, and elastically securing second spring members 24 to the flange portion 26b of the optical path-changing connector 20A.

Consequently, similar effects to those in Embodiment 2 above can also be achieved in Embodiment 3.

Embodiment 4

Figure 15:
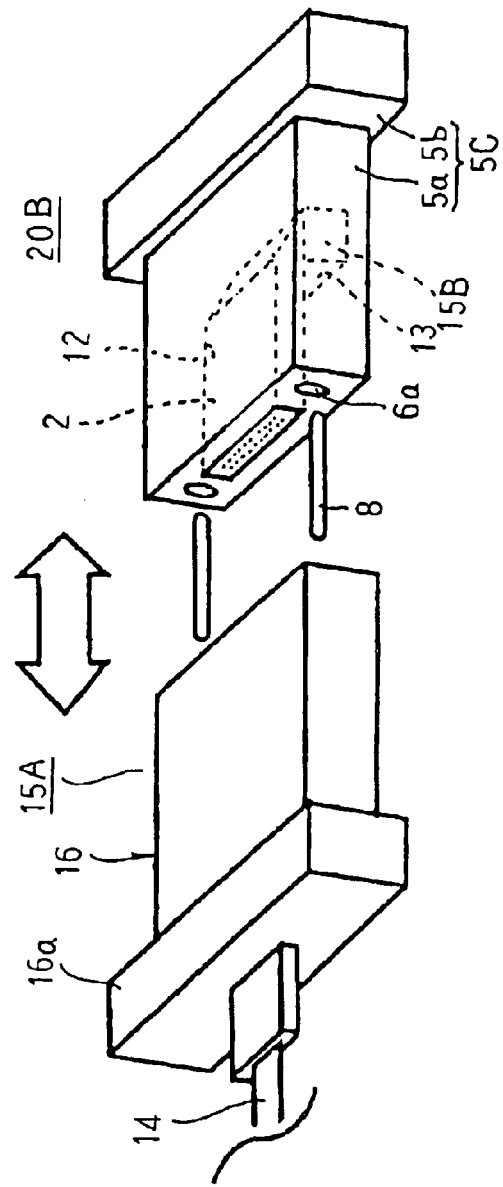
FIG. 15 is a perspective explaining a method for optically connecting external components and an optical path-changing connector according to Embodiment 4 of the present invention.
Figure 16:
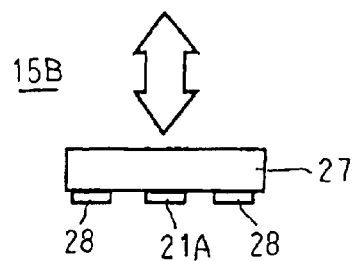
FIG. 16 is a side elevation explaining a construction of an external component from Embodiment 4 of the present invention.
Figure 17:
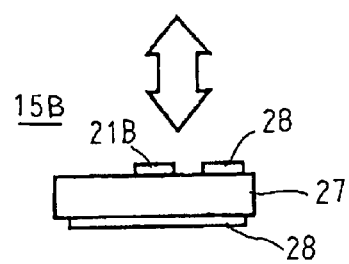
FIG. 17 is a side elevation explaining another construction of an external component from Embodiment 4 of the present invention.

FIG. 15 is a perspective explaining a method for optically connecting external components and an optical path-changing connector according to Embodiment 4 of the present invention.

In FIG. 15, an optical path-changing connector 20B is secured by bonding an optical path-changing device 2 to an inner surface of an accommodating aperture 12 of a device exterior casing member 5C with the optical axes thereof positionally adjusted. A second external component 15B is inserted inside the window 13 of the device exterior casing member 5C and is fixed using an adhesive to the second face 4b of the optical path-changing device 2 with the optical axes of the optoelectronic converting elements 21 positionally adjusted to align with the second core end surfaces 3b of the optical path-changing device 2.

In the optical path-changing connector 20B constructed in this manner, optical connection between the external component core end surfaces of a first external component 15A and the optoelectronic converting elements 21 of a second external component 15B can be achieved simply by connecting the optical path-changing connector 20B to the first external component 15A. Because the second external component 15B is integrated into the optical path-changing device 2, reductions in size are enabled. In addition, because the second external component 15B is fixed to the optical path-changing device 2 with the optical axes thereof positionally adjusted, loss resulting from misalignment is reduced.

Here, a connecting construction between the optical path-changing device 2 and the second external component 15B in Embodiment 4 will be explained with reference to FIGS. 16 to 21.

The second external component 15B is prepared by a semiconductor manufacturing technique, for example. Optoelectronic converting elements 21 are formed two-dimensionally on the silicon substrate 27. These optoelectronic converting elements 21 include: rear-surface-receiving or -emitting optoelectronic converting elements 21A such as those shown in FIG. 16 in which an anode electrode and a cathode electrode are formed on a surface on an opposite side from a light-receiving or -emitting surface; and front-surface-receiving or -emitting optoelectronic converting elements 21B such as those shown in FIG. 17 in which either an anode electrode and a cathode electrode is formed on the light-receiving or -emitting surface. Moreover, in FIGS. 16 and 17, 28 indicates electrode pads, the arrows indicating the direction of light reception or emission.

Figure 18:
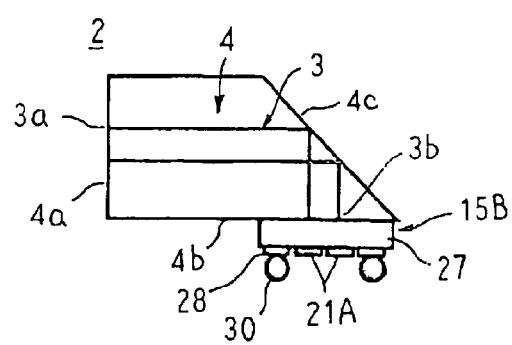
FIG. 18 is a side elevation explaining a connecting construction between an external component and an optical path-changing device in Embodiment 4 of the present invention.

In a connecting construction between an optical path-changing device 2 and a second external component 15B provided with rear-surface-receiving or -emitting optoelectronic converting elements 21A, as shown in FIG. 18, the second face 4b of the optical path-changing device 2 is stacked on a surface of the silicon substrate 27 not formed with optoelectronic converting elements, optical axis adjustment between the second core end surfaces 3b and the rear-surface-receiving or -emitting optoelectronic converting elements 21A is performed, and then the optical path-changing device 2 and the second external component 15B are fixed to each other. Electrical connection solder 30 is formed on the electrode pads 28 in order to enable electrical connection to be made between the rear-surface-receiving or -emitting optoelectronic converting elements 21A and other electrical components. Moreover, the method for fixing the silicon substrate 27 and the optical path-changing device 2 together may be any method capable of fixing the silicon substrate 27 and the optical path-changing device 2 together and, for example, adhesives such as epoxy, acrylic, or silicone adhesives, etc., can be used. An electrically-conductive resin can also be used instead of the solder for the electrical connection between the rear-surface-receiving or -emitting optoelectronic converting elements 21A and the other electrical components.

Figure 19:
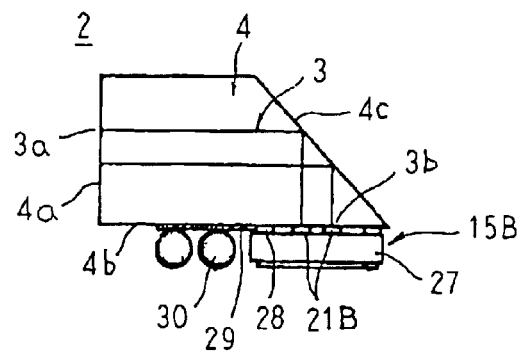
FIG. 19 is a side elevation explaining another connecting construction between an external component and an optical path-changing device in Embodiment 4 of the present invention.

In a first connecting construction between an optical path-changing device 2 and a second external component 15B provided with front-surface-receiving or -emitting optoelectronic converting elements 21B, as shown in FIG. 19, the second face 4b of the optical path-changing device 2 is stacked on the surface of the silicon substrate 27 formed with the optoelectronic converting elements, optical axis adjustment between the second core end surfaces 3b and the front-surface-receiving or -emitting optoelectronic converting elements 21B is performed, and then leader electrodes 29 formed on the second face 4b and the electrode pads 28 are soldered together. An adhesive is injected into gaps between the second face 4b and the silicon substrate 27 and cured. Electrical connection solder 30 is formed on the leader electrodes 29 in order to enable electrical connection to be made between the front-surface-receiving or -emitting optoelectronic converting elements 21B and other electrical components. Moreover, adhesives such as epoxy, acrylic, or silicone adhesives, etc., for example, can be used for the adhesive injected into the gaps between the second face 4b and the silicon substrate 27. An electrically-conductive resin can also be used instead of the solder for the electrical connection between the leader electrodes 29 and the electrode pads 28. In addition, an electrically-conductive resin can also be used instead of the solder for the electrical connection between the front-surface-receiving or -emitting optoelectronic converting elements 21B and the other electrical components.

Figure 20:
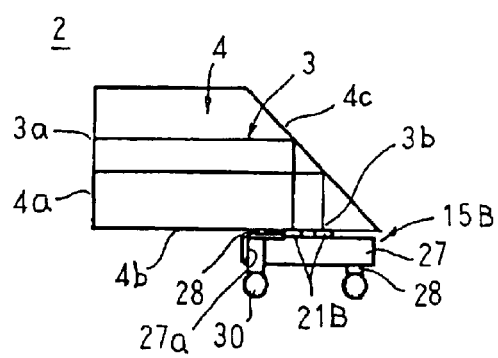
FIG. 20 is a side elevation explaining another connecting construction between an external component and an optical path-changing device in Embodiment 4 of the present invention.

In a second connecting construction between an optical path-changing device 2 and a second external component 15B provided with front-surface-receiving or -emitting optoelectronic converting elements 21B, as shown in FIG. 20, the second face 4b of the optical path-changing device 2 is stacked on the surface of the silicon substrate 27 formed with the optoelectronic converting elements, optical axis adjustment between the second core end surfaces 3b and the front-surface-receiving or -emitting optoelectronic converting elements 21B is performed, and then the optical path-changing device 2 and the second external component 15B are fixed to each other with adhesive. A penetrating aperture 27a electrically connected to the electrode pads 28 is formed through this silicon substrate 27, electrical connection solder 30 being formed on an outer electrode pad of this penetrating aperture 27a in order to enable electrical connection to be made between the front-surface-receiving or -emitting optoelectronic converting elements 21B and other electrical components.

Figure 21:
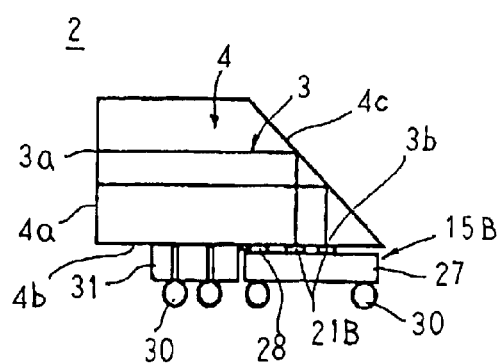
FIG. 21 is a side elevation explaining another connecting construction between an external component and an optical path-changing device in Embodiment 4 of the present invention.

In a third connecting construction between an optical path-changing device 2 and a second external component 15B provided with front-surface-receiving or -emitting optoelectronic converting elements 21B, as shown in FIG. 21, the second face 4b of the optical path-changing device 2 is stacked on the surface of the silicon substrate 27 formed with the optoelectronic converting elements, optical axis adjustment between the second core end surfaces 3b and the front-surface-receiving or -emitting optoelectronic converting elements 21B is performed, and then leader electrodes 29 formed on the second face 4b and the electrode pads 28 are soldered together. An adhesive is injected into gaps between the second face 4b and the silicon substrate 27 and cured. In addition, inner electrode pads of a penetrating aperture substrate 31 and the leader electrodes 29 are soldered together, electrical connection solder 30 is formed on the leader electrodes 29 in order to enable electrical connection to be made between the front-surface-receiving or -emitting optoelectronic converting elements 21B and other electrical components.

Embodiment 5

Figure 22:
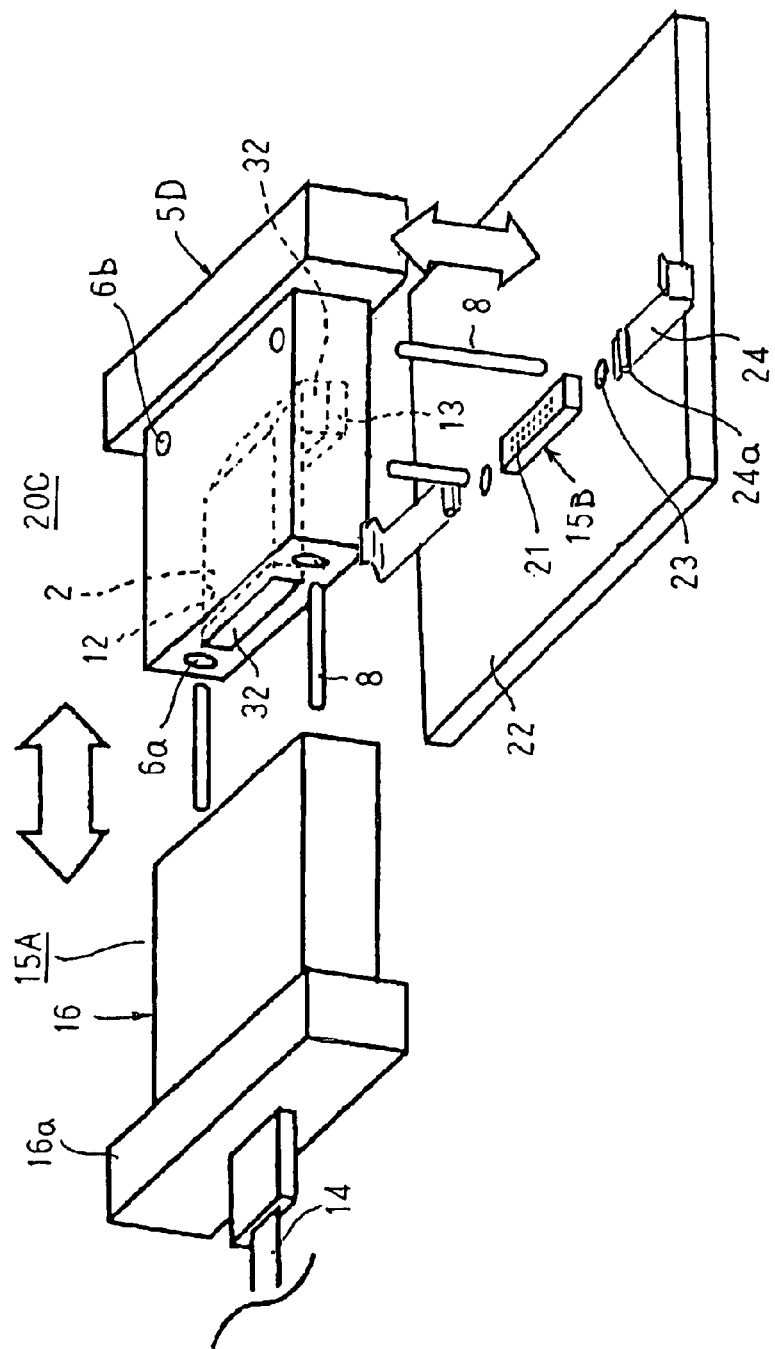
FIG. 22 is a perspective explaining a method for optically connecting external components and an optical path-changing connector according to Embodiment 5 of the present invention.

FIG. 22 is a perspective explaining a method for optically connecting external components and an optical path-changing connector according to Embodiment 5 of the present invention.

In FIG. 22, microlenses 32 are fixed to the first face 4a and the second face 4b of the optical path-changing device 2 of an optical path-changing connector 20C such that the optical axes thereof are positionally adjusted relative to the core segments 3. These microlenses 32 are formed with a convex shape or a concave shape so as to function as lenses to condense the light passing through or to make the light parallel.

Moreover, the rest of this embodiment is constructed in a similar manner to Embodiment 2 above.

In Embodiment 5, when the optical path-changing connector 20C and first and second external components 15A and 15B are connected, the device cores 3 of the optical path-changing device 2 and the waveguide cores of the first external component 15A are optically connected by means of a microlens 32, and the device cores 3 of the optical path-changing device 2 and the optoelectronic converting elements 21 of the second external component 15B are also optically connected by means of a microlens 32.

Thus, when light enters one of the device cores 3 of the optical path-changing device 2 from one of the waveguide cores of the first external component 15A, the light is condensed or made parallel by the corresponding microlens 32 before entering the device core 3. When light enters one of the waveguide cores of the first external component 15A from one of the device cores 3 of the optical path-changing device 2, the light is condensed or made parallel by the corresponding microlens 32 before entering the waveguide core of the first external component 15A. Moreover, the same also applies to the light received and emitted between the optical path-changing device 2 and the second external component 15B.

Consequently, according to Embodiment 5, coupling loss between the optical path-changing device 2 and the first and second external components 15A and 15B is suppressed.

Here, the microlenses 32 are not limited to convex shapes or concave shapes provided that they suppress divergence of the light and, for example, portions composed of a medium allowing light to propagate in the manner of optical fibers may also be used. The material of the microlenses 32 may be any material functioning as a lens and, for example, resin materials such as epoxy, acrylic, or silicone resins, etc., or inorganic materials such as quartzes, alumina, glasses, etc., can be used.

Adhesives such as epoxy, acrylic, or silicone adhesives, etc., can be used to fasten the microlenses 32 to the first and second faces 4a and 4b, but the fastening of the microlenses 32 is not limited to this method.

Moreover, in Embodiment 5 above, microlenses 32 are fixed to both the first face 4a and the second face 4b of the optical path-changing device 2, but a microlens 32 may also be fixed solely to the first face 4a or solely to the second face 4b of the optical path-changing device 2.

A hard coating film, or an anti-reflection film, etc., may also be coated onto a surface of the microlenses 32 to prevent the occurrence of scratching, reflection, etc.

Embodiment 6

Figure 23:
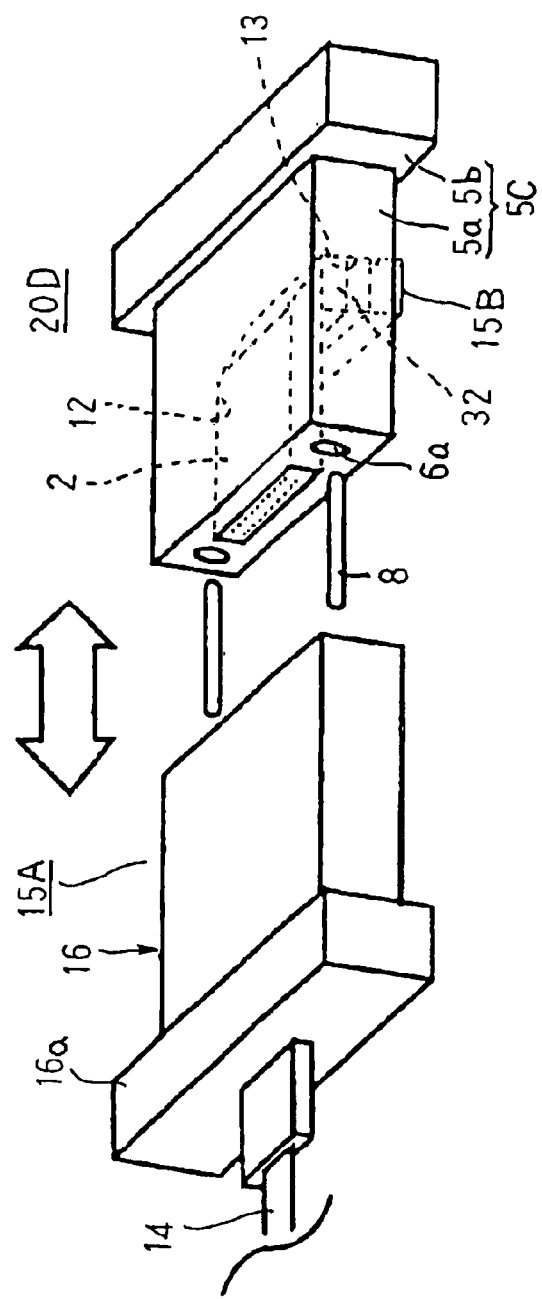
FIG. 23 is a perspective explaining a method for optically connecting external components and an optical path-changing connector according to Embodiment 6 of the present invention.

FIG. 23 is a perspective explaining a method for optically connecting external components and an optical path-changing connector according to Embodiment 6 of the present invention.

In FIG. 23, a microlens 32 is fixed to the second face 4b of the optical path-changing device 2 of an optical path-changing connector 20D such that the optical axes thereof are positionally adjusted relative to the core segments 3, and a second external component 15B is fixed to the microlens 32 with the optical axes thereof positionally adjusted.

Moreover, the rest of this embodiment is constructed in a similar manner to Embodiment 4 above.

According to Embodiment 6, because the optoelectronic converting elements 21 of the second external component 15B are optically connected to the second core end surfaces 3b of the device cores 3 by means of the microlenses 32, aggravation of coupling loss resulting from divergence of the light received and emitted is suppressed.

Embodiment 7

Figure 24:
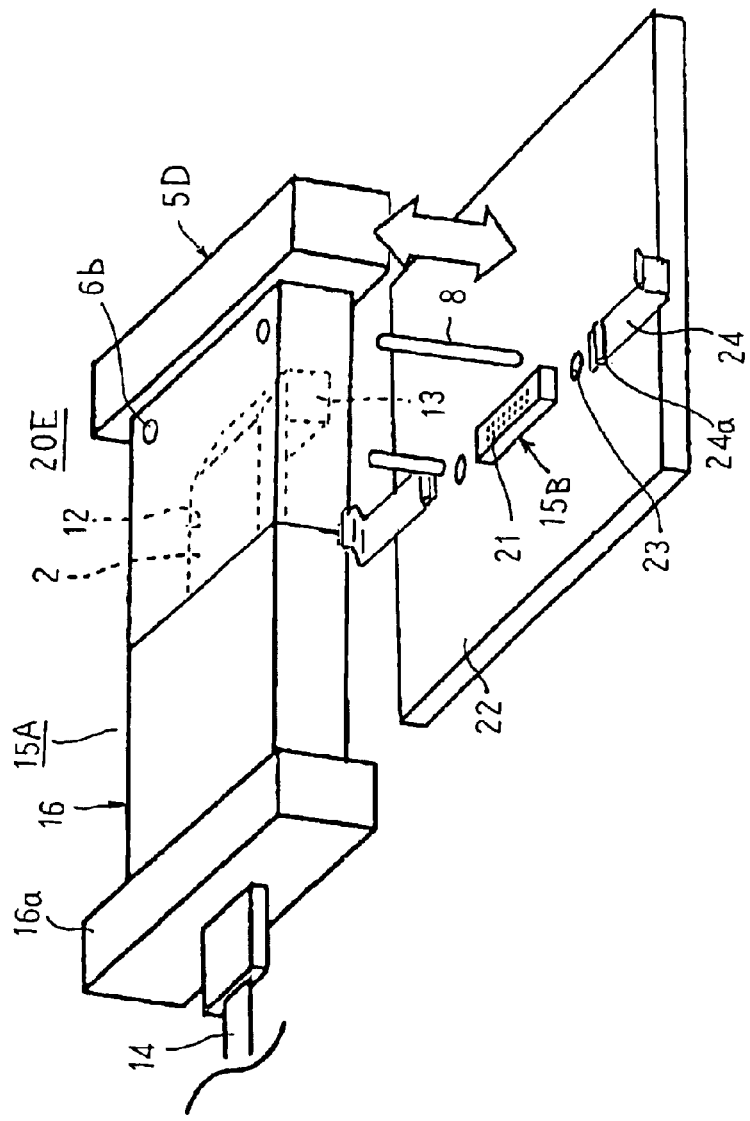
FIG. 24 is a perspective explaining a method for optically connecting external components and an optical path-changing connector according to Embodiment 7 of the present invention.

FIG. 24 is a perspective explaining a method for optically connecting external components and an optical path-changing connector according to Embodiment 7 of the present invention.

In FIG. 24, in an optical path-changing connector 20E, a first external component 15A is fixed to a device exterior casing member 5D with the optical axes thereof positionally adjusted to the device cores 3 of an optical path-changing device 2.

Moreover, the rest of this embodiment is constructed in a similar manner to Embodiment 2 above.

According to Embodiment 7, because the first external component 15A is integrated with the optical path-changing connector 20E, the first spring member 9 can be omitted and the optical path-changing connector 20E can be used as an optical cable connector.

Embodiment 8

Figure 25:
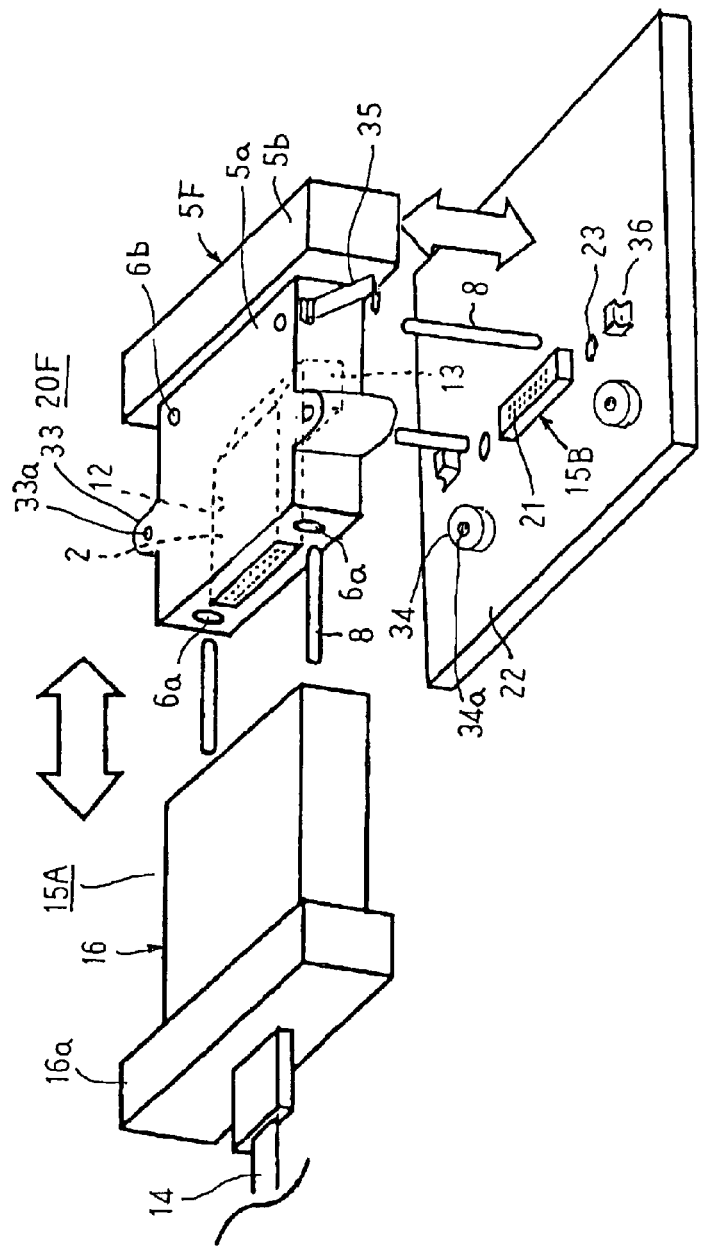
FIG. 25 is a perspective explaining a method for optically connecting external components and an optical path-changing connector according to Embodiment 8 of the present invention.

FIG. 25 is a perspective explaining a method for optically connecting external components and an optical path-changing connector according to Embodiment 8 of the present invention.

In FIG. 25, a pair of mounting seats 33 are formed on a device exterior casing member 5F. In addition, a pair of third spring members 35 functioning as an elastic fastening member are disposed on the device exterior casing member 5F. Metal anchor fittings 34 and metal brace fittings 36 are also formed on a circuit board 22.

Moreover, this device exterior casing member 5F is constructed by disposing the mounting seats 33 and the third spring members 35 on the device exterior casing member 5C from Inventive Example 3 in Embodiment 1 above. An optical path-changing connector 20F is constructed in a similar manner to the optical path-changing connector 20 according to Embodiment 2 above except for the fact that this device exterior casing member 5F is used instead of that device exterior casing member 5C.

In Embodiment 8, a pair of positioning pins 8 are inserted into each of the circuit board pin insertion apertures 23 of the circuit board 22, and the optical path-changing connector 20F is mounted to the circuit board 22 by inserting the pair of positioning pins 8 inside each of the connector second pin insertion apertures 6b. Thus, the optoelectronic converting elements 21 in the second external component 15B are inserted inside the window 13 of the device exterior casing member 5F and placed in close contact with the second core end surfaces 3b of the device cores 3 of an optical path-changing device 2 with the optical axes of each aligned.

Next, the optical path-changing connector 20F and the second external component 15B are elastically fastened by the third spring members 35 by elastically securing the third spring members 35 to the metal brace fittings 36 of the circuit board 22. Thereafter, the optical path-changing connector 20F and the second external components 15B are fastened by passing mounting screws (not shown) through penetrating apertures 33a in the mounting seats 33 and fastening the screws to screw-threaded apertures 34a in the metal anchor fittings 34. Thus, the optoelectronic converting elements 21 in the second external component 15B and the second core end surfaces 3b in the optical path-changing device 2 are maintained in an optically-connected state. Then, the first external component 15A is optically connected to the optical path-changing connector 20F.

Thus, according to Embodiment 8, the optical path-changing connector 20F can be stably fixed to the circuit board 22 or a housing, increasing the reliability of the optical connection. Because the first external component 15A can be removed and inserted with the optical path-changing connector 20F fixed to the circuit board 22 or the housing, loads applied during removal and insertion of the first external component 15A are less likely to act upon the optical path-changing connector 20F, thereby improving durability.

Moreover, in Embodiment 8, the mounting seats 33 are formed integrally on the device exterior casing member 5F, but it goes without saying that mounting seats may also be constructed as separate parts.

In Embodiment 8, third spring members 35 are mounted to the device exterior casing member 5F, but it goes without saying that a spring member for elastically fastening the optical path-changing connector 20F and the first external component 15A may also be mounted to the device exterior casing member 5F. In that case, metal brace fittings for the spring members should be disposed on the first external component 15A.

Embodiment 9

Figure 26:
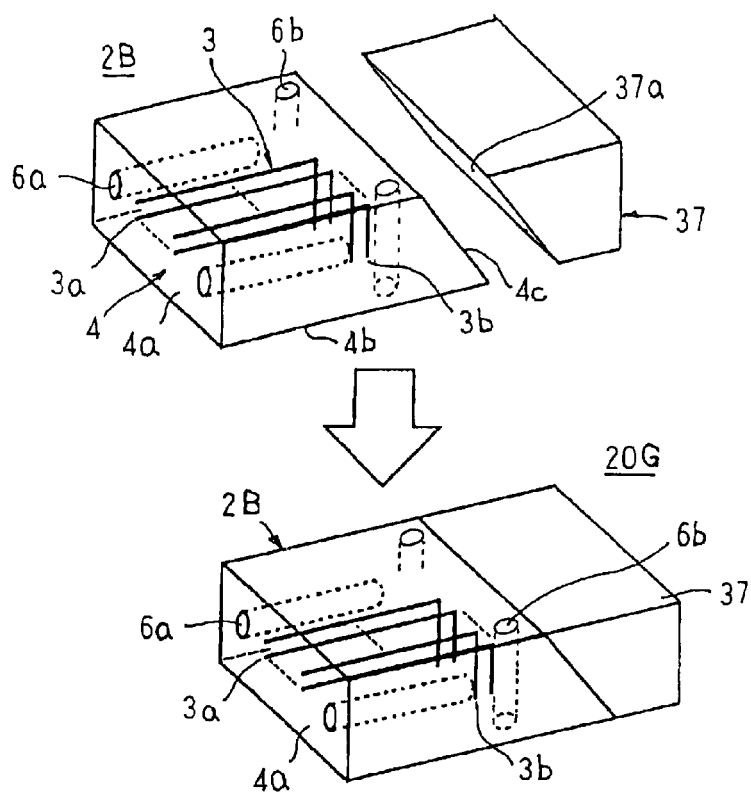
FIG. 26 is a perspective explaining a method for manufacturing an optical path-changing connector according to Embodiment 9 of the present invention.
Figure 27:
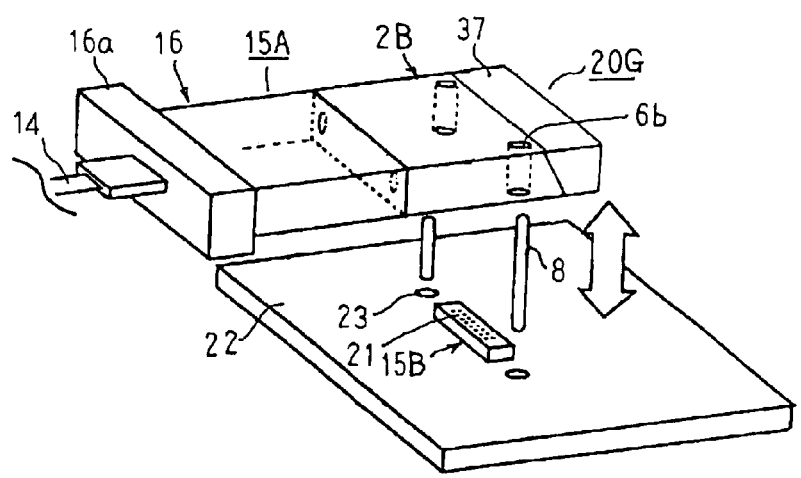
FIG. 27 is a perspective explaining a method for optically connecting external components and the optical path-changing connector according to Embodiment 9 of the present invention.

FIG. 26 is a perspective explaining a method for manufacturing an optical path-changing connector according to Embodiment 9 of the present invention, and FIG. 27 is a perspective explaining a method for optically connecting external components and the optical path-changing connector according to Embodiment 9 of the present invention.

In FIG. 26, an optical path-changing device 2B is constructed by arranging two-dimensionally a plurality of device cores 3 for propagating light, and embedding the device cores 3 in a device cladding 4 having an index of refraction that is less than that of the device cores 3. The device cladding 4 has a first face 4a, a second face 4b, and a mirror surface 4c positioned between the first face 4a and the second face 4b. Each of the device cores 3 is constructed so as to extend from the first face 4a to the mirror surface 4c, be reflected at the mirror surface 4c, and extend to the second face 4b. First core end surfaces 3a of the device cores 3 are exposed in a 2-by-n matrix shape at the first face 4a, and second core end surfaces 3b are exposed in a 2-by-n matrix shape at the second face 4b.

A pair of connector first pin insertion apertures 6a functioning as a first positioning member are formed in the first face 4a of the device cladding 4 on mutually opposite sides of the two-dimensionally-arranged first core end surfaces 3a. Each of the connector first pin insertion apertures 6a has a predetermined positional relationship relative to the two-dimensionally-arranged first core end surfaces 3a and the aperture directions thereof are formed parallel to the optical axes of the portions of the device cores 3 extending from the first face 4a to the mirror surface 4c. In other words, the connector first pin insertion apertures 6a are positionally adjusted relative to the optical axes of the first core end surfaces 3a.

Similarly, a pair of connector second pin insertion apertures 6b functioning as a second positioning member are formed in the second face 4b of the device cladding 4 on mutually opposite sides of the two-dimensionally-arranged second core end surfaces 3b. Each of the connector second pin insertion apertures 6b has a predetermined positional relationship relative to the two-dimensionally-arranged second core end surfaces 3b and the aperture directions thereof are formed parallel to the optical axes of the portions of the device cores 3 extending from the second face 4b to the mirror surface 4c. In other words, aperture directions of the second pin insertion apertures 6b are positionally adjusted relative to the optical axes of the second core end surfaces 3b.

A flange portion 37 has an inclined surface 37a matching the angle formed between the second face 4b and the mirror surface 4c of the device cladding 4.

An optical path-changing connector 20G is configured into a rectangular parallelepiped by fixing the inclined surface 37a of the flange portion 37 to the mirror surface 4c of the device cladding 4 of the optical path-changing device 2B.

Moreover, this optical path-changing device 2B is constructed in a similar manner to the optical path-changing device 2 above except for the fact that the connector first and second pin insertion apertures 6a and 6b are disposed therein.

Next, a method for optically connecting first and second external components 15A and 15B using an optical path-changing connector 20G constructed in this manner will be explained with reference to FIG. 27. Moreover, first and second spring members 9 and 24 have been omitted from FIG. 27.

First, a pair of positioning pins 8 (not shown) are inserted into each of the connector first pin insertion apertures 6a of the optical path-changing connector 20G. The first external component 15A is mounted to the optical path-changing connector 20G by inserting the pair of positioning pins 8 inside each of the first external component pin insertion apertures 19. Thus, the external component core end surfaces 17a in the first external component 15A are placed in close contact with the first core end surfaces 3a of the device cores 3 of the optical path-changing device 2B with the optical axes of each aligned. Next, the optical path-changing connector 20G and the first external component 15A are elastically fastened by a first spring member 9 (not shown) by elastically securing the first spring member 9 to the flange portion 37 of the optical path-changing connector 20G and the flange portion 16a of the first external component 15A. Thus, the external component core end surfaces 17a in the first external component 15A and the first core end surfaces 3a in the optical path-changing device 2B are optically connected so as to be maintained in a state of close contact with the optical axes of each aligned.

Next, as indicated by the arrows in FIG. 27, a pair of positioning pins 8 are inserted into each of the circuit board pin insertion apertures 23 of the circuit board 22. The optical path-changing connector 20G is mounted to the circuit board 22 by inserting the pair of positioning pins 8 inside each of the connector second pin insertion apertures 6b. Thus, the optoelectronic converting elements 21 in the second external component 15B are placed in close contact with the second core end surfaces 3b of the device cores 3 of the optical path-changing device 2B with the optical axes of each aligned. Next, the optical path-changing connector 20G and the second external component 15B are elastically fastened by the second spring members 24 (not shown) by elastically securing the second spring members 24 to the optical path-changing device 2B of the optical path-changing connector 20G. Thus, the optoelectronic converting elements 21 in the second external component 15B and the second core end surfaces 3b in the optical path-changing device 2B are optically connected so as to be maintained in a state of close contact with the optical axes of each aligned.

As a result, the external component core end surfaces 17a in the first external component 15A and the optoelectronic converting elements 21 in the second external component 15B are optically connected by means of the optical path-changing connector 20G.

According to Embodiment 9, because the connector first and second pin insertion apertures 6a and 6b are formed in the device cladding 4 in which the device cores 3 are formed, the connector first and second pin insertion apertures 6a and 6b can be formed so as to be positioned with high precision relative to the first and second core end surfaces 3a and 3b. Thus, when the first and second external components 15A and 15B and the optical path-changing connector 20G are optically connected, the optical axes of the external component core end surfaces 17a in the first external component 15A and the optical axes of the first core end surfaces 3a in the optical path-changing connector 20G are aligned with high precision, and the optical axes of the optoelectronic converting elements 21 in the second external component 15B and the optical axes of the second core end surfaces 3b in the optical path-changing connector 20G are also aligned with high precision, reducing loss due to connection.

Furthermore, the device exterior casing member is eliminated from the optical path-changing connector, enabling cost reductions.

Now, in Embodiment 9 above, the flange portion 37 need simply have the strength and durability of a connector and, for example, may also be prepared using the same cladding material as the optical path-changing device 2B.

In Embodiment 9 above, first and third spring members 9 and 35 may also be mounted to the optical path-changing device 2B and the flange portion 37.

In Embodiment 9 above, the second external component 15B may also be fixed directly to the second core end surfaces 3b of the optical path-changing device 2B with the optical axes thereof positionally adjusted. In that case, the second external component 15B can be mounted to the second core end surfaces 3b by the mounting constructions shown in FIGS. 18 to 21. In addition, the second external component 15B may also be mounted to the second core end surfaces 3b by means of a microlens 32.

In Embodiment 9 above, the first external component 15A may also be integrated with the optical path-changing device 2B with the optical axes thereof positionally adjusted.

In Embodiment 9 above, microlenses 32 may also be fixed to the first and second core end surfaces 3a and 3b of the optical path-changing device 2B with the optical axes thereof positionally adjusted.

Embodiment 10

Figure 28:
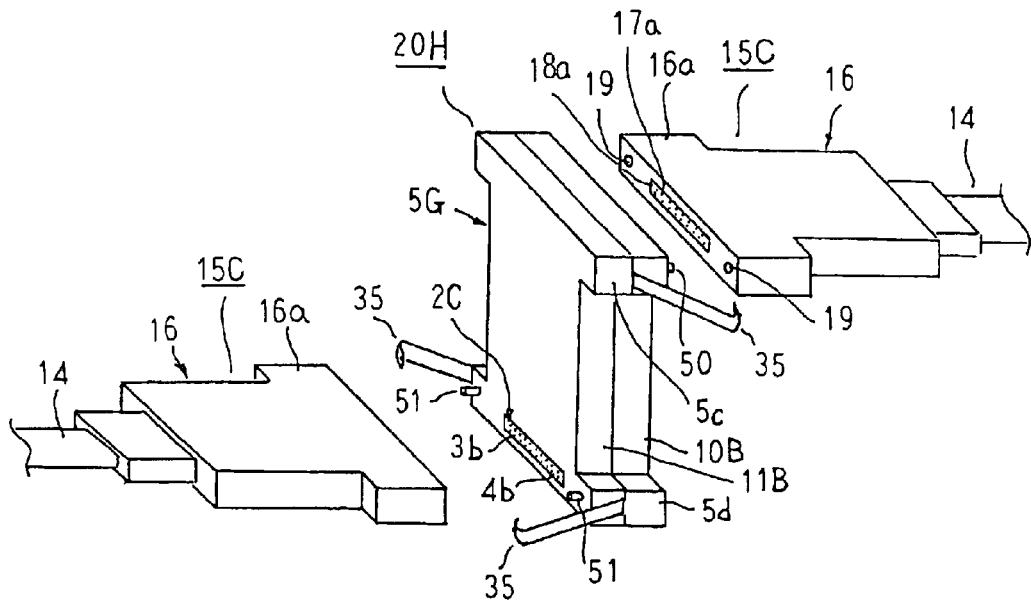
FIG. 28 is a perspective explaining a method for optically connecting external components and an optical path-changing connector according to Embodiment 10 of the present invention.
Figure 29:
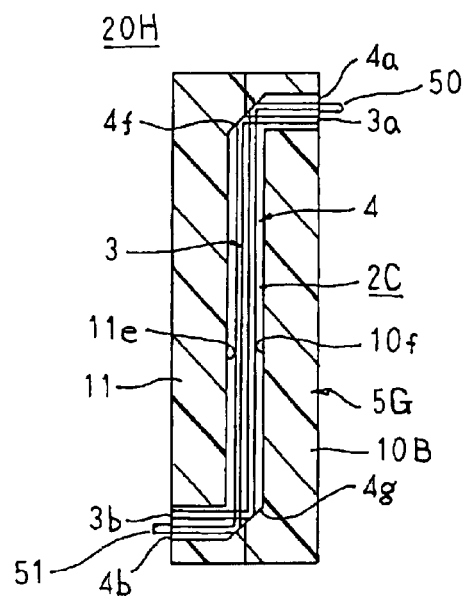
FIG. 29 is a cross section showing an optical path-changing device according to Embodiment 10 of the present invention.

FIG. 28 is a perspective explaining a method for optically connecting external components and an optical path-changing connector according to Embodiment 10 of the present invention, and FIG. 29 is a cross section showing an optical path-changing device according to Embodiment 10 of the present invention.

In FIGS. 28 and 29, an optical path-changing device 2C is constructed by arranging two-dimensionally a plurality of device cores 3 for propagating light, and embedding the device cores 3 in a device cladding 4 having an index of refraction that is less than that of the device cores 3. The device cladding 4 has a first face 4a, a second face 4b, and first and second mirror surfaces 4f and 4g positioned between the first face 4a and the second face 4b. Each of the device cores 3 is constructed into a crank or zigzag shape so as to extend from the first face 4a to the first mirror surface 4f, be bent at 90 degrees (90°) at the first mirror surface 4f and extend to the second mirror surface 4g, and be bent at 90 degrees (90°) at the second mirror surface 4g and extend to the second face 4b. First core end surfaces 3a of the device cores 3 are exposed in a 2-by-n matrix shape at the first face 4a, and second core end surfaces 3b are exposed in a 2-by-n matrix shape at the second face 4b.

A device exterior casing member 5G is constructed so as to be divided into first and second exterior casing member divisions 10B and 11B. An optical path-changing connector 20H is assembled by housing the optical path-changing device 2C inside first and second accommodating recess portions 10f and 11e of the first and second exterior casing member divisions 10B and 11B, and securely fastening the first and second exterior casing member divisions 10B and 11B by a bolt, etc., (not shown). At this time, the optical path-changing device 2C is accommodated inside the device exterior casing member 5G such that the first face 4a and the second face 4b of the device cladding 4 are exposed. A pair of first positioning pins 50 functioning as a first positioning member are disposed so as to stand on the first exterior casing member division 10B of the device exterior casing member 5G on mutually opposite sides of the first face 4a of the device cladding 4 so as to be positionally adjusted relative to the optical axes of the first core end surfaces 3a. Similarly, a pair of second positioning pins 51 functioning as a second positioning member are disposed so as to stand on the second exterior casing member division 11B of the device exterior casing member 5G on mutually opposite sides of the second face 4b of the device cladding 4 so as to be positionally adjusted relative to the optical axes of the second core end surfaces 3b. In addition, third spring members 35 are mounted to first and second flange portions 5c and 5d of the device exterior casing member 5G.

Two (first and second) external components 15C are each constructed in a similar manner to the first external component 15A in Embodiment 1 above except for the fact that flange portions 16a are formed on mutually opposite sides of the external component core end surfaces 17a.

In Embodiment 10, the first external component 15C is mounted by being placed on the optical path-changing connector 20H while inserting the pair of first positioning pins 50 into the first external component pin insertion apertures 19, and fitting the third spring members 35 over the flange portion 16a. Thus, the external component core end surfaces 17a in the first external component 15C and the first core end surfaces 3a in the optical path-changing device 2C are optically connected so as to be maintained in a state of close contact with the optical axes of each aligned.

Similarly, the second external component 15C is mounted by being placed on the optical path-changing connector 20H while inserting the pair of second positioning pins 51 into the first external component pin insertion apertures 19, and fitting the third spring members 35 over the flange portion 16a. Thus, the external component core end surfaces 17a in the second external component 15C and the second core end surfaces 3b in the optical path-changing device 2C are optically connected so as to be maintained in a state of close contact with the optical axes of each aligned.

Thus, light entering any one of the first core end surfaces 3a of the optical path-changing device 2C from a corresponding external component core end surface 17a of the first external component 15C has its optical path converted by 90 degrees (90°) at each of the first and second mirror surfaces 4f and 4g, and enters a corresponding external component core end surface 17a of the second external component 15C from the second core end surface 3b.

Thus, according to Embodiment 10, in addition to the effects of Embodiment 1 above, an optical path-changing connector 20H can be achieved that can change the optical path in a crank or zigzag shape.

Embodiment 11

Figure 30:
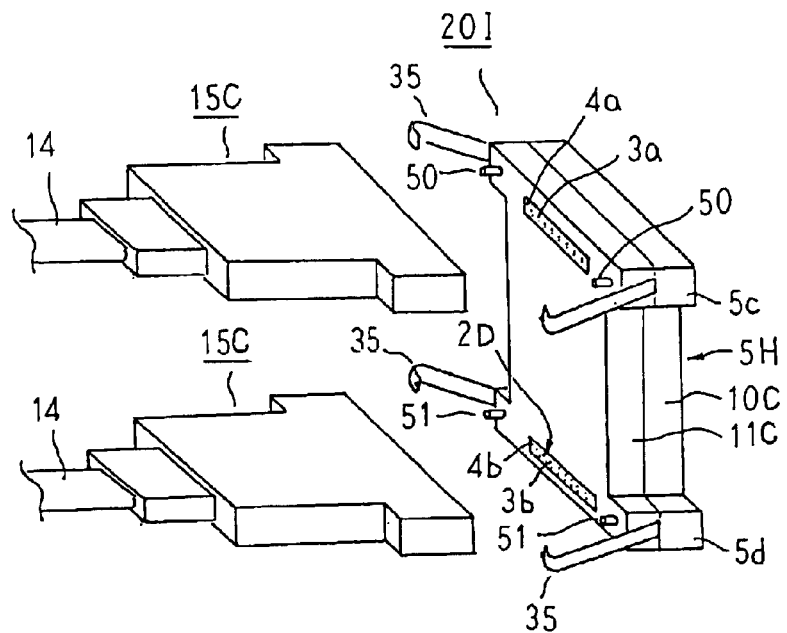
FIG. 30 is a perspective explaining a method for optically connecting external components and an optical path-changing connector according to Embodiment 11 of the present invention.
Figure 31:
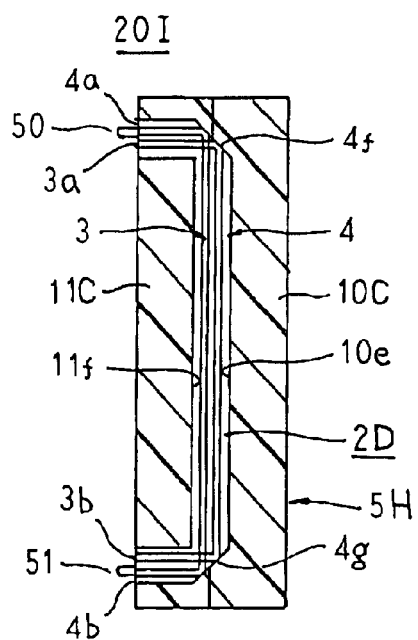
FIG. 31 is a cross section showing an optical path-changing device according to Embodiment 11 of the present invention.

FIG. 30 is a perspective explaining a method for optically connecting external components and an optical path-changing connector according to Embodiment 11 of the present invention, and FIG. 31 is a cross section showing an optical path-changing device according to Embodiment 11 of the present invention.

In FIGS. 30 and 31, an optical path-changing device 2B is constructed by arranging two-dimensionally a plurality of device cores 3 for propagating light, and embedding the device cores 3 in a device cladding 4 having an index of refraction that is less than that of the device cores 3. The device cladding 4 has a first face 4a, a second face 4b, and first and second mirror surfaces 4f and 4g positioned between the first face 4a and the second face 4b. Each of the device cores 3 is constructed into a square bracket ("[") shape so as to extend from the first face 4a to the first mirror surface 4f, be bent at 90 degrees (90°) at the first mirror surface 4f and extend to the second mirror surface 4g, and be bent at 90 degrees (90°) at the second mirror surface 4g and extend to the second face 4b. First core end surfaces 3a of the device cores 3 are exposed in a 2-by-n matrix shape at the first face 4a, and second core end surfaces 3b are exposed in a 2-by-n matrix shape at the second face 4b.

A device exterior casing member 5H is constructed so as to be divided into first and second exterior casing member divisions 10C and 11C. An optical path-changing connector 20I is assembled by housing the optical path-changing device 2D inside first and second accommodating recess portions 10g and 11f of the first and second exterior casing member divisions 10C and 11C, and securely fastening the first and second exterior casing member divisions 10C and 11C by a bolt, etc., (not shown). At this time, the optical path-changing device 2D is accommodated inside the device exterior casing member 5H such that the first face 4a and the second face 4b of the device cladding 4 are exposed. A pair of first positioning pins 50 functioning as a first positioning member are disposed so as to stand on the second exterior casing member division 11C of the device exterior casing member 5H on mutually opposite sides of the first face 4a of the device cladding 4 so as to be positionally adjusted relative to the optical axes of the first core end surfaces 3a. Similarly, a pair of second positioning pins 51 functioning as a second positioning member are disposed so as to stand on the second exterior casing member division 11C of the device exterior casing member 5H on mutually opposite sides of the second face 4b of the device cladding 4 so as to be positionally adjusted relative to the optical axes of the second core end surfaces 3b. In addition, third spring members 35 are mounted to first and second flange portions 5c and 5d of the device exterior casing member 5H.

In Embodiment 11, a first external component 15C is mounted by being placed on the optical path-changing connector 20I while inserting the pair of first positioning pins 50 into the first external component pin insertion apertures 19, and fitting the third spring members 35 over the flange portion 16a. Thus, the external component core end surfaces 17a in the first external component 15C and the first core end surfaces 3a in the optical path-changing device 2D are optically connected so as to be maintained in a state of close contact with the optical axes of each aligned.

Similarly, a second external component 15C is mounted by being placed on the optical path-changing connector 20I while inserting the pair of second positioning pins 51 into the first external component pin insertion apertures 19, and fitting the third spring members 35 over the flange portion 16a. Thus, the external component core end surfaces 17a in the second external component 15C and the second core end surfaces 3b in the optical path-changing device 2D are optically connected so as to be maintained in a state of close contact with the optical axes of each aligned.

Thus, light entering any one of the first core end surfaces 3a of the optical path-changing device 2D from a corresponding external component core end surface 17a of the first external component 15C has its optical path converted by 90 degrees (90°) at each of the first and second mirror surfaces 4f and 4g, and enters a corresponding external component core end surface 17a of the second external component 15C from the second core end surface 3b.

Thus, according to Embodiment 11, in addition to the effects of Embodiment 1 above, an optical path-changing connector 20I can be achieved that can change the optical path in a square bracket ("[") shape.

Moreover, in Embodiments 1 to 8 above, the connector first and second pin insertion apertures 6a and 6b are formed in the device exterior casing members to facilitate machining and provide strength, but the connector first and second pin insertion apertures 6a and 6b may also be formed directly in the first or second optical path-changing device 2 or 2A in a similar manner to Embodiment 9 above. In that case, the optical axes of the external component core end surfaces in the first external component 15A and the optical axes of the first core end surfaces 3a are aligned with high precision, and the optical axes of the optoelectronic converting elements 21 in the second external component 15B and the optical axes of the second core end surfaces 3b are also aligned with high precision, reducing loss due to connection.

In each of the above embodiments, a second external component 15B composed of optoelectronic converting elements 21 is optically connected to the second core end surfaces 3b, but a first external component 15A composed of optical waveguides may also be optically connected to the second core end surfaces 3b. In that case, two first external components 15A composed of optical waveguides are optically connected by means of the optical path-changing connector.

In each of the above embodiments, the first core end surfaces 3a and the second core end surfaces 3b of the device cores 3 are arranged two-dimensionally on the first face 4a and the second face 4b of the device cladding 4 in a matrix shape having 2 rows by n columns, where n is an integer greater than or equal to 2, but it is only necessary for the first core end surfaces 3a and the second core end surfaces 3b to be arranged two-dimensionally and the number of rows and the number of columns may be set arbitrarily as required. Nor is it necessary for an array pitch of the first core end surfaces 3a and the second core end surfaces 3b to be a uniform pitch; the array pitch may be set arbitrarily as required. In addition, it is not necessary for the first core end surfaces 3a and the second core end surfaces 3b to be arranged into perfect matrix shapes; the number of rows may be different in each column, or vice versa. In other words, in a 3-by-10 matrix-shaped array, the arrangement may be such that one column has one core end surface, another column has two, and the remaining columns have three each, for example.

In each of the above embodiments, the first core end surfaces 3a and the second core end surfaces 3b of the device cores 3 are arranged two-dimensionally on the first face 4a and the second face 4b of the device cladding 4 in a matrix shape having 2 rows by n columns, where n is an integer greater than or equal to 2, but it goes without saying that the present invention can also be applied to constructions in which the first core end surfaces 3a and the second core end surfaces 3b of the device cores 3 are arranged one-dimensionally on the first face 4a and the second face 4b of the device cladding 4.

In each of the above embodiments, the number and arrangement of the first and second core end surfaces 3a and 3b and the number and arrangement of the external component core end surfaces 17a and the optoelectronic converting elements 21 of the external components are explained as being the same, but it goes without saying that the number and arrangement of the first and second core end surfaces 3a and 3b and the number and arrangement of the external component core end surfaces 17a and the optoelectronic converting elements 21 of the external components do not necessarily have to match exactly.

In the present invention, the mode of the light which propagates inside the two-dimensionally-arranged cores 3 may also be either a single mode or a multimode.

What is claimed is:

1. An optical path-changing connector for optical connection to a first external component having a positioned member, the first external component including one of optical waveguides and optoelectronic converting elements arranged one-dimensionally or two-dimensionally, said optical path-changing connector comprising:
    an optical path-changing device comprising:
        a cladding having a first face, a second face, and at least one mirror surface; and
        a plurality of cores, each core having a first core end surface exposed at said first face and a second core end surface exposed at said second face, each core constituting a continuous optical path extending from said first core end surface to said mirror surface, changing in direction at said mirror surface, and extending to said second core end surface, wherein said first core end surfaces and said second core end surfaces are arranged one-dimensionally or two-dimensionally at said first face and said second face, respectively; and
    a first positioning member positionally adjusted relative to optical axes of said first core end surfaces for positioning said first external component relative to said first core end surfaces by engaging said positioning member.

2. The optical path-changing connector according to claim 1, further comprising an exterior casing member accommodating said optical path-changing device, wherein said optical path-changing device is accommodated in and fixed to said exterior casing member such that optical axes in said optical path-changing device are positionally adjusted and said first and second faces are exposed.

3. The optical path-changing connector according to claim 2, wherein said exterior casing member is divided into a plurality of exterior casing member divisions.

4. The optical path-changing connector according to claim 3, including an engaging portion on at least one of said exterior casing member divisions and a receiving portion on said optical path-changing device, said optical path-changing device being constructed such that optical axes therein are positionally adjusted by engagement between said engaging portion and said receiving portion.

5. The optical path-changing connector according to claim 2, including an optical path-changing device insertion aperture is through said exterior casing member, wherein said optical path-changing device is inserted into said optical path-changing device insertion aperture and fixed to said optical path-changing device insertion aperture such that said first and second faces are exposed and optical axes in said optical path-changing device are positionally adjusted.

6. The optical path-changing connector according to claim 2, wherein said first positioning member is on said exterior casing member.

7. The optical path-changing connector according to claim 6, further comprising a second positioning member positionally adjusted relative to optical axes of said second core end surfaces, wherein a second external component including one of optical waveguides and optoelectronic converting elements arranged one-dimensionally or two-dimensionally for optical connection to said second core end surfaces by said second positioning member.

8. The optical path-changing connector according to claim 7, wherein said second positioning member is on said exterior casing member.

9. The optical path-changing connector according to claim 7, further comprising an elastic fastening member for elastically fastening said second external component in an optically connected state.

10. The optical path-changing connector according to claim 1, wherein said first positioning member is on said first face of said optical path-changing device.

11. The optical path-changing connector according to claim 10, further comprising a second positioning member positionally adjusted relative to optical axes of said second core end surfaces, wherein a second external component including one of optical waveguides and optoelectronic converting elements arranged one-dimensionally or two-dimensionally for optical connection to said second core end surfaces by said second positioning member.

12. The optical path-changing connector according to claim 11, wherein said second positioning member is on said second face of said optical path-changing device.

13. The optical path-changing connector according to claim 11 further comprising an elastic fastening member for elastically fastening said second external component in an optically connected state.

14. The optical path-changing connector according to claim 1, wherein a second external component including one of optical waveguides and optoelectronic converting elements arranged one-dimensionally or two-dimensionally is mounted to said second face of said optical path-changing device and positionally adjusted relative to optical axes in said optical path-changing device.

15. The optical path-changing connector according to claim 1, including a microlens fixed to at least one of said first and second faces.

16. The optical path-changing connector according to claim 1, further comprising a mounting seat for fastening.

17. The optical path-changing connector according to claim 1, further comprising an elastic fastening member for elastically fastening said first external component in an optically connected state.

* * * * *